(12) United States Patent
Kimura

(10) Patent No.: US 11,404,923 B2
(45) Date of Patent: Aug. 2, 2022

(54) ELECTRIC MOTOR AND STATOR ASSEMBLY

(71) Applicant: DENSO CORPORATION, Kariya (JP)

(72) Inventor: Akihiro Kimura, Kariya (JP)

(73) Assignee: DENSO CORPORATION, Kariya (JP)

( * ) Notice: Subject to any disclaimer, the term of this patent is extended or adjusted under 35 U.S.C. 154(b) by 281 days.

(21) Appl. No.: 16/856,313

(22) Filed: Apr. 23, 2020

(65) Prior Publication Data
US 2020/0373796 A1 Nov. 26, 2020

(30) Foreign Application Priority Data
May 21, 2019 (JP) .............................. JP2019-095149

(51) Int. Cl.
*H02K 1/18* (2006.01)
*B62D 5/04* (2006.01)
(Continued)

(52) U.S. Cl.
CPC ........... *H02K 1/185* (2013.01); *B62D 5/0463* (2013.01); *H02K 5/06* (2013.01); *H02K 21/16* (2013.01); *H02K 2213/03* (2013.01)

(58) Field of Classification Search
CPC ...... B62D 5/0463; B62D 5/0406; H02K 5/06; H02K 1/146; H02K 1/185; H02K 21/16;
(Continued)

(56) References Cited

U.S. PATENT DOCUMENTS 7,164,218 B2 * 1/2007 Kimura ................. F04C 23/008
310/58

7,363,696 B2 * 4/2008 Kimura .................... F01C 21/10
29/598
(Continued)

FOREIGN PATENT DOCUMENTS

| JP | 4036148 B2 | 11/2007 |
| JP | 2008-193778 A | 8/2008 |
| JP | 6075539 B2 | 1/2017 |

OTHER PUBLICATIONS

U.S. Appl. No. 16/856,323, dated Apr. 23, 2020, Apr. 23, 2020, Kimura.

*Primary Examiner* — Alex W Mok
(74) *Attorney, Agent, or Firm* — Maschoff Brennan

(57) ABSTRACT

A stator assembly has a motor housing of a cylindrical shape and a stator fixed to an inner peripheral wall of the motor housing by a shrink fitting process. A stator core of the stator includes a projecting portion in contact with the motor housing and a stopper portion, which is smaller than the projecting portion in a radial direction. The stopper portion is in contact with the motor housing in an actual-use temperature range. The projecting portions and the stopper portions are alternately arranged in a circumferential direction in a cyclic manner. A cycle unit is composed of one or more than one projecting portion and one or more than one stopper portion. Multiple stator core sheets are built up in such a way that the cycle units are alternately arranged in an axial direction and neighboring stator core sheets are displaced in the circumferential direction by a predetermined shift angle. A curvature radius of the projecting portion at a position, at which the projecting portion is in contact with the motor housing, is smaller than a radius of a circumscribed circle of the projecting portion.

13 Claims, 16 Drawing Sheets

(51) Int. Cl.
*H02K 5/06* (2006.01)
*H02K 21/16* (2006.01)

(58) Field of Classification Search
CPC ........ H02K 5/1732; H02K 11/33; H02K 5/15; H02K 9/22; H02K 2213/03; H02K 2211/03
USPC .......................................................... 310/89
See application file for complete search history.

(56) References Cited

U.S. PATENT DOCUMENTS

| | | | |
|---|---|---|---|
| 8,258,670 B2* | 9/2012 | Sakuma | H02K 1/185 310/216.118 |
| 9,729,018 B2* | 8/2017 | Koenig | H02K 1/20 |
| 9,806,566 B2* | 10/2017 | Nagao | H02K 1/148 |
| 2004/0124731 A1 | 7/2004 | Kimura et al. | |
| 2007/0063593 A1* | 3/2007 | Braun | H02K 5/15 310/58 |
| 2015/0042199 A1* | 2/2015 | Iwata | H02K 1/148 310/216.009 |
| 2018/0248419 A1* | 8/2018 | Nigo | H02K 1/02 |

* cited by examiner

FIG. 16

RELATIONSHIP AMONG UNIT-ELEMENT NUMBER "m", CYCLE-UNIT NUMBER "N" AND SHIFT ANGLE "θ"

$$\text{SHIFT ANGLE } \theta \text{ (°)} = \frac{360}{m \times N}$$

| N \ m | 2 | 3 | 4 | 5 | 6 |
|---|---|---|---|---|---|
| ~~1~~ | ~~180.00~~ | ~~120.00~~ | ~~90.00~~ | ~~72.00~~ | ~~60.00~~ |
| 2 | 90.00 | 60.00 | 45.00 | 36.00 | 30.00 |
| 3 | 60.00 | 40.00 | 30.00 | 24.00 | 20.00 |
| 4 | 45.00 | 30.00 | 22.50 | 18.00 | 15.00 |
| 5 | 36.00 | 24.00 | 18.00 | 14.40 | 12.00 |
| 6 | 30.00 | 20.00 | 15.00 | 12.00 | 10.00 |
| 8 | 22.50 | 15.00 | 11.25 | 9.00 | 7.50 |
| 9 | 20.00 | 13.33 | 10.00 | 8.00 | 6.67 |
| 10 | 18.00 | 12.00 | 9.00 | 7.20 | 6.00 |
| 12 | 15.00 | 10.00 | 7.50 | 6.00 | 5.00 |

ELECTRIC MOTOR AND STATOR ASSEMBLY

CROSS REFERENCE TO RELATED APPLICATION

This application is based on Japanese Patent Application No.2019-095149 filed on May 21, 2019, the disclosure of which is incorporated herein by reference.

FIELD OF TECHNOLOGY

The present disclosure relates to an electric motor and a stator assembly therefor.

BACKGROUND

An electric motor is known in the art, according to which a stator is assembled to an inner peripheral wall of a cylindrical housing by an interference fitting process, such as, a shrink fitting process.

For example, in one of the prior arts, contacting areas and non-contacting areas are alternately provided in a circumferential direction of a stator, wherein a part of an outer periphery of the stator is in contact with an inner peripheral surface of a motor housing in the contacting area, while another part of the outer periphery of the stator is not in contact with the inner peripheral surface of the motor housing in the non-contacting area. The above structure reduces not only degradation of magnetic property to be caused by compression stress but also iron loss.

In the above prior art, the stator has the contacting area in which the part of the outer periphery of the stator is in contact with the inner peripheral surface of the motor housing. In the present disclosure, such a part of the contacting area is referred to as a projecting portion. Tensile stress in a circumferential direction is applied by the projecting portion to the motor housing in the contacting area. When such a circumferential stress applied to the motor housing becomes larger, the motor housing may be damaged and broken.

SUMMARY OF THE DISCLOSURE

The present disclosure is made in view of the above problem.

It is an object of the present disclosure to provide an electric motor and a stator assembly, according to which circumferential stress applied to a motor housing by an interference fitting process between the stator and the motor housing is uniformaliized.

In general, a term of "an interference fitting process" includes a press fitting process, a shrink fitting process and a cooling fitting process. When the stator assembly in a finished state is observed and analyzed by a person skilled in the art, it is possible to identify which of the fitting process is used for fixing the stator to the motor housing. In the present disclosure, the structure of the stator assembly is explained in a condition that it is completed. The stator assembly in the finished state should not be limited by the manufacturing process.

BRIEF DESCRIPTION OF THE DRAWINGS

The above and other objects, features and advantages of the present disclosure will become more apparent from the following detailed description made with reference to the accompanying drawings. In the drawings:

FIG. 16 is a table showing a relationship between a unit element number, a cycle unit number and a shift angle.

DETAILED DESCRIPTION OF THE EMBODIMENTS

Embodiment

An electric motor and a stator assembly will be explained with reference to the drawings. The electric motor of the present embodiment is used, for example, as a steering assist motor for an electric power steering system of an automotive vehicle.

Figure 1:
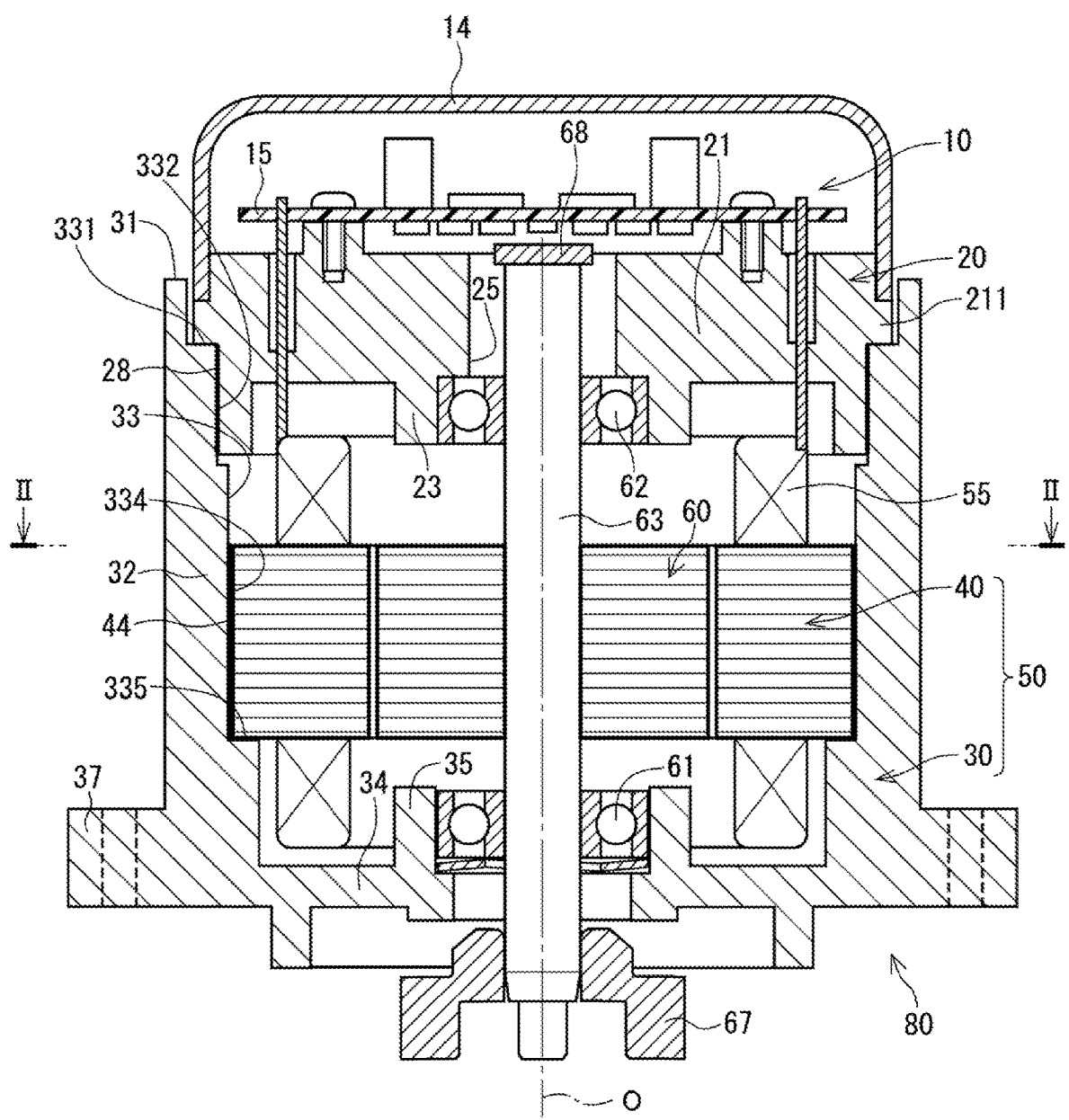
FIG. 1 is a schematic cross-sectional view showing an electric motor, to which a stator according to an embodiment of the present disclosure is fixed.

A structure of the electric motor 80 will be explained with reference to FIG. 1, which shows a cross section of the electric motor 80. The electric motor 80 is one of mechatronic products, according to which a control unit 10 (hereinafter, the ECU 10) is integrally assembled to the electric motor 80 at one of its axial ends (at an upper-side end of FIG. 1). The present disclosure can be, however, applied to an electric motor of another type, according to which the ECU is separately provided from the electric motor. In the present disclosure, a lower side of the electric motor 80 in FIG. 1 is referred to as a front side, while an upper side of the electric motor 80 in FIG. 1 is referred to as a rear side which is also referred to as a cover side. A center of a rotating shaft 63 of the electric motor 80 is referred to as a rotational axis "O".

The electric motor 80 is composed of a multiple-phase brushless motor, which includes a motor housing 30 of a cylindrical shape, a stator 40, a rotor 60 and so on. The stator 40 is fixed to an inner peripheral wall of the motor housing 30 by an interference fitting process. In general, the interference fitting process includes a shrink fitting process, a press fitting process and a cooling fitting process. In the present disclosure, the shrink fitting process is mainly used as the interference fitting process. A sub-assembly, which is in a condition that the stator 40 is fixed to the motor housing 30 during a manufacturing stage, is referred to as a stator assembly 50 in the present disclosure.

The motor housing 30 is made of aluminum alloy, more exactly, made of "ADC12" which is an alloy for a di-casting process. A 0.2-percent withstanding force of "ADC12" is about 150 MPa, which is lower than that of a general metal. Technical significance of the present embodiment is further increased in the stator assembly 50, when the metal having lower mechanical strength is used for the motor housing 30.

The motor housing 30 of the cylindrical shape has a cylindrical portion 32 and a closed bottom portion 34 at the front side thereof. An inner diameter of an inner peripheral wall 33 of the cylindrical portion 32 is stepwise reduced in an axial direction from the rear side to the front side of the motor housing 30. The rear side of the cylindrical portion 32 is opened and has a heat-sink receiving portion 331, which is a step portion formed at a position neighboring to an axial end surface 31. A heat sink 20 has a body portion 21 and a flange portion 211, which is inserted to the heat-sink receiving portion 331. An outer wall 28 of the heat sink 20 is fixed to a heat-sink insertion portion 332, which is a part of the inner peripheral wall of the motor housing 30. An outer peripheral wall of the stator 40 is fixed to a stator insertion portion 334 of the motor housing 30 by the shrink fitting process. A stator receiving portion 335, which is a step portion formed in the inner peripheral wall 33 of the motor housing 30, receives a front-side surface of the stator 40.

A front-side bearing holding portion 35 is formed in the bottom portion 34 of the motor housing 30 to hold an outer race of a front-side bearing 61. The front-side bearing 61 rotatably supports a front-side end of the rotating shaft 63. A stay portion 37 is formed at an outer periphery of the bottom portion 34 of the cylindrical portion 32.

The heat sink 20 is provided at an open end portion of the motor housing 30, which is an opposite side to the bottom portion 34, so that the heat sink 20 is opposed to a rear-side surface of the stator 40 and a rear-side surface of the rotor 60. The heat sink 20 has the body portion 21, at a center of which a through-hole 25 is formed as a shaft insertion hole, and a bearing holding portion 23 for holding an outer race of a rear-side bearing 62. The rear-side bearing 62 rotatably supports a rear-side end of the rotating shaft 63.

The stator 40 includes a stator core, which is made of iron alloy, more exactly, made of magnetic steel sheets. In the present embodiment, the stator core is composed of a single-type stator core. Multiple stator core sheets, each of which has an annular shape extending in a circumferential direction, are built up in the axial direction of the electric motor 80 to form the stator core of the stator 40. Alternatively, as explained below, the stator core may be composed of a division-type stator core, which is formed by multiple core units divided in the circumferential direction and connected to one another in the circumferential direction. Multiple stator core sheets are built up in the axial direction in each of the core units. A stator coil 55 is wound on the stator core of the stator 40 for generating a magnetic field upon receiving electric power.

The rotor 60 is movably accommodated in a radial-inside space of the stator 40. The rotor 60 is made of multiple rotor core sheets, which are built up in the axial direction. The rotor 60 has multiple permanent magnets (not shown) along its outer periphery. The rotor 60 is rotated around the rotating shaft 63 by a rotating magnetic field, which is generated when the electric power is supplied to the stator coil 55.

The rotating shaft 63, which is fixed to a center of the rotor 60, is rotatably supported by the front-side bearing 61 held by the bottom portion 34 of the motor housing 30 and by the rear-side bearing 62 held by the heat sink 20. A joint 67 is connected to the front-side end of the rotating shaft 63 for transmitting rotation of the electric motor 80 to an outside. A permanent magnet 68 is fixed to the rear-side end of the rotating shaft 63 for detecting a rotational angle of the rotating shaft 63.

The ECU 10 includes a printed circuit board 15 fixed to the heat sink 20 and various kinds of electric and/or electronic parts and components (hereinafter, the electronic parts), which are mounted to the printed circuit board 15. Heat generated at the electronic parts upon receiving the electric power is transferred to the heat sink 20 and radiated to the outside of the electric motor 80. A cover member 14 is provided at the rear side of the electric motor 80, in such a way that a front-side end of the cover member 14 is brought into contact with the flange portion 211 of the heat sink 20.

Figure 2:
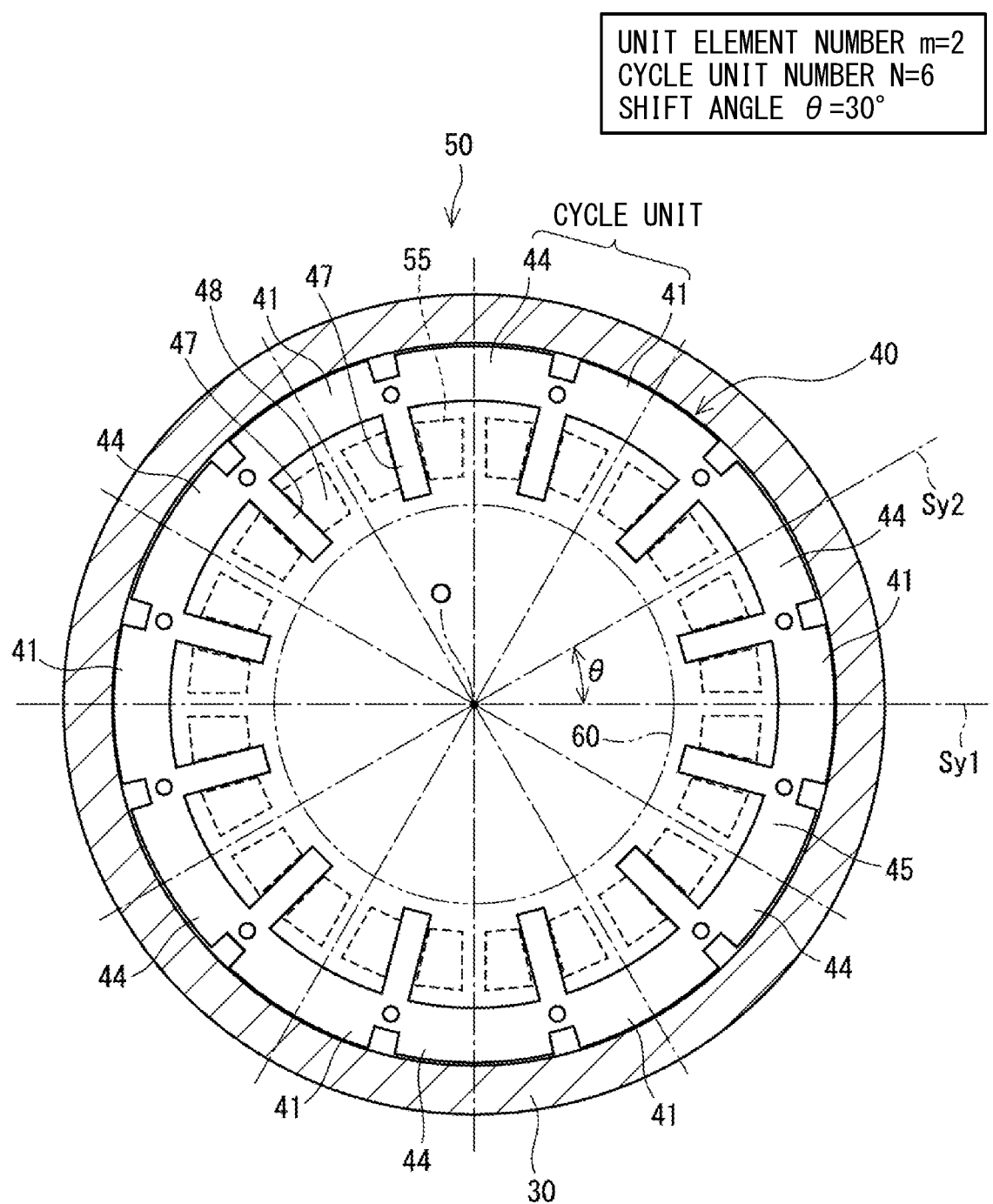
FIG. 2 is a schematic cross-sectional view taken along a line II-II in FIG. 1.
Figure 3:
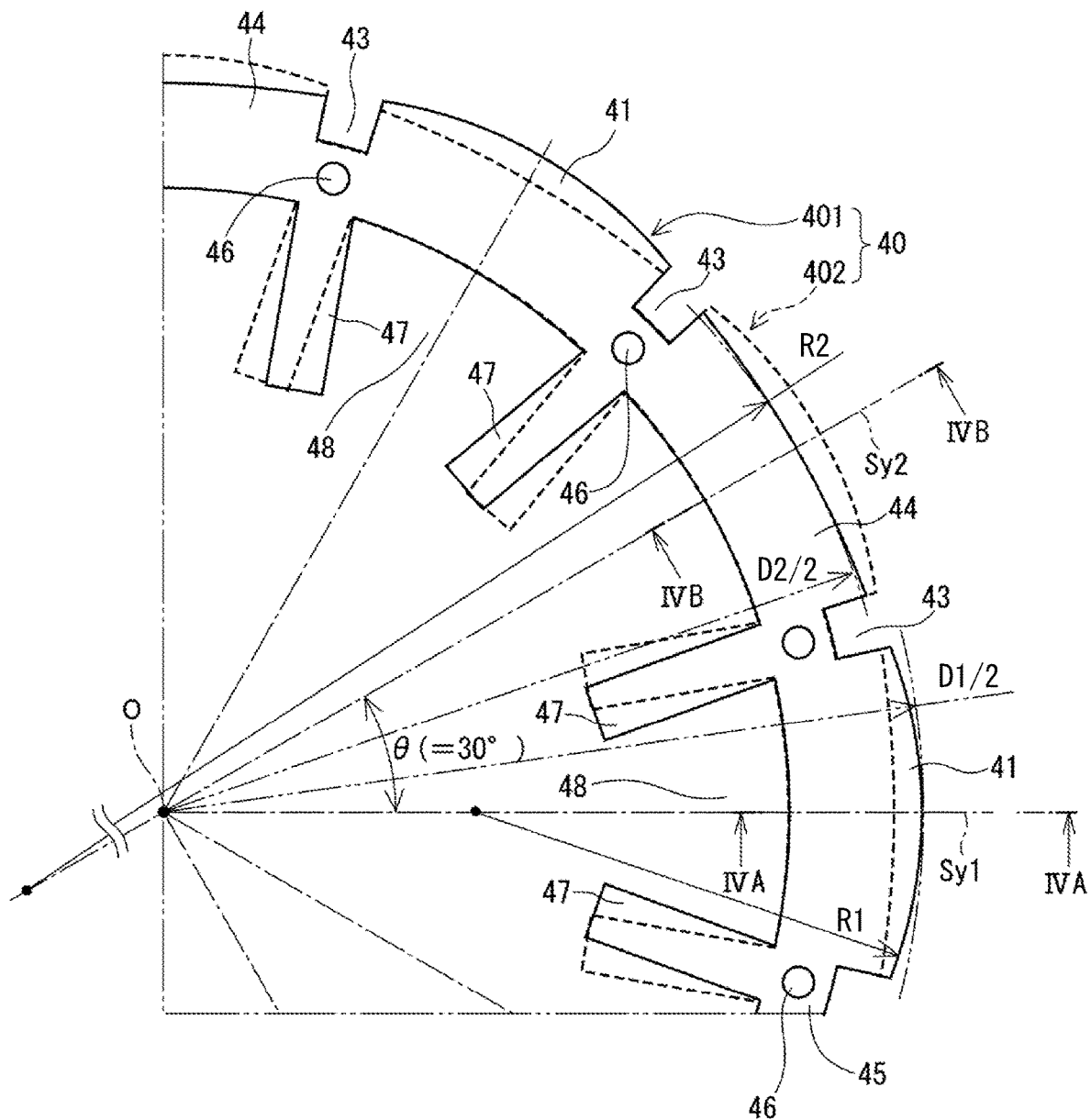
FIG. 3 is a schematically enlarged view showing a part of the stator before it is assembled to a motor housing by an interference fitting process.
Figure 4A:
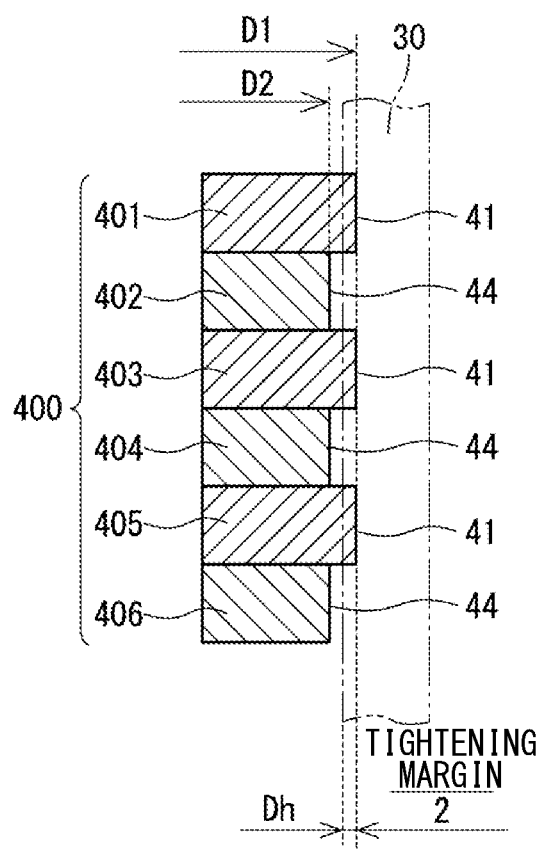
FIG. 4A is a schematic cross sectional view taken along a line IVA-IVA in FIG. 3.
Figure 4B:
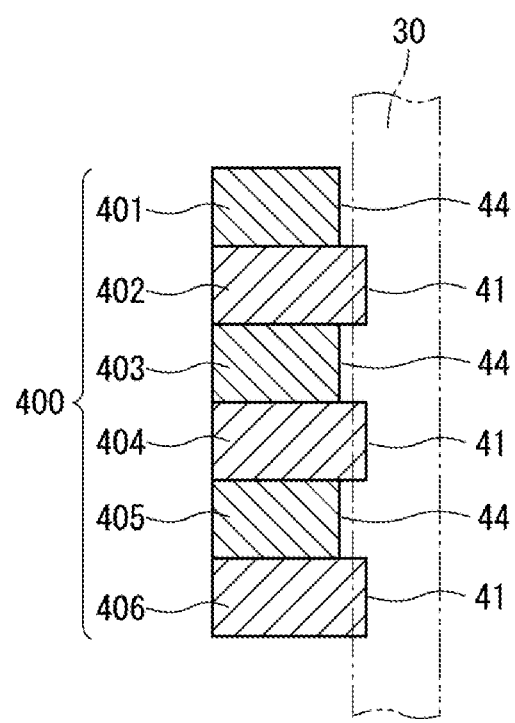
FIG. 4B is a schematic cross sectional view taken along a line IVB-IVB in FIG. 3.

A structure of the stator assembly 50 will be further explained with reference to FIGS. 2 to 4. The stator assembly 50 is shown in FIG. 2 in a condition that the stator 40 is fixed to the motor housing 30 by the interference fitting process (the shrink fitting process). The stator 40 is shown in FIGS. 3 and 4, in a condition that the stator 40 is not yet fixed to the motor housing 30. As explained above, the stator core 400 of the stator 40 is composed of the multiple stator core sheets, which are built up in the axial direction. In FIGS. 4A and 4B, each of which is a cross-sectional view of the stator core 400 of the stator 40 of FIG. 3, an upper-most stator core sheet is referred to as a first stator core sheet 401, while the other stator core sheets are referred to as a second stator core sheet 402, a third stator core sheet 403 and so on, in a sequential order. Only for the purpose of explanation, six stator core sheets 401 to 406 are shown in FIGS. 4A and 4B.

In FIG. 3, the first stator core sheet 401 is indicated by a solid line, while the second stator core sheet 402 is indicated by a dotted line, whether or not the second stator core sheet 402 conceals itself behind the first stator core sheet 401.

Since each of the stator core sheets 401 to 406 is substantially the same to one another, explanation will be mainly made for the first stator core sheet 401. Multiple projecting portions 41 and multiple stopper portions 44 are alternately formed in a back-yoke portion 45 of an annular shape in a circumferential direction thereof at equal intervals. In the present embodiment, a groove portion 43 is formed in each circumferential boundary portion between the projecting portion 41 and the stopper portion 44, wherein an inner diameter of the groove portion 43 is smaller than an outer diameter of the stopper portion 44.

The rotational axis "O" of the rotating shaft 63 (FIG. 1) corresponds to a center "O" of the stator 40 (FIGS. 2 and 3), which is hereinafter also referred to as a stator center "O". The projecting portion 41 is symmetric with respect to a virtual straight line, which extends from the stator center "O" to a circumferential center of the projecting portion 41. The virtual straight line is referred to as a first symmetrical axis Sy1 of the projecting portion 41. In a similar manner, the stopper portion 44 is symmetric with respect to a virtual straight line, which extends from the stator center "O" to a circumferential center of the stopper portion 44. The virtual straight line is referred to as a second symmetrical axis Sy2 of the stopper portion 44. In addition, a curved line of the projecting portion 41 at its outer periphery as well as a curved line of the stopper portion 44 at its outer periphery is respectively referred to as an outer peripheral line, wherein the projecting portion 41 is in contact with the inner peripheral wall of the motor housing 30 at the outer peripheral line. The stopper portion 44 is in contact with or separated from but opposed to the inner peripheral wall of the motor housing 30 at the outer peripheral line.

The outer peripheral line of the projecting portion 41 has an arc shape, a curvature radius R1 of which has a center on the first symmetrical axis Sy1. The curvature radius R1 is also referred to a first curvature radius R1. A virtual circle, which has a center at the stator center "O" and which passes over the circumferential center of the outer peripheral line of the projecting portion 41, is defined as a first virtual circle. A diameter of the first virtual circle is also referred to as a first diameter D1. In the present embodiment, the first curvature radius R1 is smaller than a radius (D1/2) of the first virtual circle. Namely, a relationship of "R1<(D1/2)" is satisfied. The first virtual circle corresponds to a circumscribed circle of the projecting portion 41. In a modification of the present embodiment, the relationship of "R1<(D1/2)" may be changed to a relationship of "R1≤(D1/2)". Namely, the circumscribed circle of the first virtual circle includes such a circumscribed circle having the first curvature radius R1, which is equal to the radius (D1/2) of the first virtual circle (R1=(D1/2)).

In a similar manner, the outer peripheral line of the stopper portion 44 has an arc shape, a curvature radius R2 of which has a center on the second symmetrical axis Sy2. The curvature radius R2 is also referred to as a second curvature radius R2. A virtual circle, which has a center at the stator center "O" and which passes over the circumferential center of the outer peripheral line of the stopper portion 44, is defined as a second virtual circle. A diameter of the second virtual circle is also referred to as a second diameter D2. In the present embodiment, the curvature radius R2 is larger than a curvature radius (D2/2) of the second virtual circle. Namely, a relationship of "R2>(D2/2)" is satisfied. The second virtual circle corresponds to an inscribed circle of the stopper portion 44. In a modification of the present embodiment, the relationship of "R2>(D2/2)" may be changed to a relationship of "R2≥(D2/2)". In such a modification, the second virtual circle is referred to as the inscribed circle or a circumscribed circle of the stopper portion 44. Namely, the inscribed circle or the circumscribed circle of the second virtual circle includes such an inscribed circle or a circumscribed circle having the second curvature radius R2, which is equal to the radius (D2/2) of the second virtual circle (R2=(D2/2)).

At least a circumferential part of the outer periphery of the projecting portion 41 is in contact with the inner peripheral wall of the motor housing 30. Since the first curvature radius R1 of the circumferential part which is in contact with the inner peripheral wall of the motor housing 30 is smaller than the radius (D1/2) of the circumscribed circle, a circumferential center portion of the projecting portion 41 corresponds to the above circumferential part which is in contact with the inner peripheral wall of the motor housing 30.

The stopper portion 44 is smaller than the projecting portion 41 in a radial direction of the stator 40. At least a circumferential part of the outer periphery of the stopper portion 44 is in contact with the inner peripheral wall of the motor housing 30 in a predetermined range of an actual-use temperature range. A meaning of the actual-use temperature range will be explained below with reference to FIG. 6. Ideally, a whole circumferential area of the outer periphery of the stopper portion 44 is brought into contact with the inner peripheral wall of the motor housing 30 in the predetermined range of the actual-use temperature range. However, the whole circumferential area is not always brought into contact with the inner peripheral wall due to component tolerance or the like. As a result, not the whole but the circumferential part of the outer periphery of the stopper portion 44 is in contact with the inner peripheral wall of the motor housing 30.

As shown in FIGS. 2 and 3, in each of the first and the second stator core sheets 401 and 402, the projecting portions 41 and the stopper portions 44 are alternately arranged in the circumferential direction and the first symmetrical axis Sy1 of the projecting portion 41 in the first stator core sheet 401 and the second symmetrical axis Sy2 of the stopper portion 44 in the second stator core sheet 402 overlap with each other in the axial direction. Each of the third and other odd-numbered stator core sheets 403 and 405 is arranged in the same phase to the first stator core sheet 401. In a similar manner, each of the fourth and other even-numbered stator core sheets 404 and 406 is arranged in the same phase to the second stator core sheet 402. In the present disclosure, a phase difference between the neighboring stator core sheets, for example, the difference in the circumferential direction between the projecting portion 41 of the first stator core sheet 401 and the projecting portion 41 of the second stator core sheet 402, is defined as a shift angle "θ". An angle between the first symmetrical axis Sy1 and the second symmetrical axis Sy2 of each stator core sheet (for example, the first stator core sheet 401) can be also referred to as the shift angle "θ".

As above, the projecting portions 41 and the stopper portions 44 are alternately arranged in the circumferential direction of the stator 40 in such a manner that the projecting portion 41 and the stopper portion 44 are arranged in a cyclic manner. In the present disclosure, a combination of one projecting portion 41 and one stopper portion 44 is defined as a cyclic unit. As shown in FIGS. 4A and 4B, the cyclic units, each of which includes one projecting portion 41 and one stopper portion 44, appear alternately in the axial direction of FIG. 4A and in the axial direction of FIG. 4B. In other words, the cycle unit of the projecting portion 41 and the stopper portion 44 appears in the cross section of FIG. 4A in a cyclic manner and the cycle unit of the stopper portion 44 and the projecting portion 41 appears in the cross section of FIG. 4B in the cyclic manner. The neighboring stator core sheets (for example, the first and the second stator core sheets 401 and 402) are so built up in the axial direction that each of the stator core sheets is displaced from each other in the circumferential direction by the predetermined shift angle "θ".

More exactly, in the cross section of FIG. 4A, the projecting portion 41 appears in each of the first, the third and the fifth stator core sheets 401, 403 and 405, while the stopper portion 44 appears in the second, the fourth and the sixth stator core sheets 402, 404 and 406. On the other hand, in the cross section of FIG. 4B, the projecting portion 41 appears in each of the second, the fourth and the sixth stator core sheets 402, 404 and 406, while the stopper portion 44 appears in the first, the third and the fifth stator core sheets 401, 403 and 405. The first diameter D1 of the circumscribed circle of the projecting portions 41 is larger than an inner diameter Dh of the motor housing 30, so that a radial different between them works as a tightening margin. A compression amount for each projecting portion 41 in the radial direction becomes equal to "the tightening margin/2".

In the present disclosure, a total number of the projecting portion 41 and the stopper portion 44 in one cyclic unit is defined as a unit element number "m". A number of the cycle units in an angular range of 360 degrees (360°) in the circumferential direction is defined as a cycle unit number "N". The shift angle "θ" is calculated by a formula of "θ=360×n/(m×N)[°]", wherein "n" is a natural number other than "m". In the structure shown in FIGS. 2 and 3, the unit element number "m" is equal to 2 (two) and the cycle unit number "N" is equal to 6 (six). In a case that "n" is equal to 1 (one), the shift angle "θ" is equal to 30°. In a case that "n" is 3 (three), the shift angle "θ" becomes 90°.

In a case of the three-phase motor, the cycle unit number "N" becomes a multiple of 3 (three) to ensure symmetry of the three phases. In addition, in a case of an electric motor having two groups of three-phase windings, the cycle unit number "N" becomes a multiple of 6 (six). In a simplest structure for the cycle unit, wherein the cycle unit has one projecting portion 41 and one stopper portion 44, the unit element number "m" becomes 2 (two). The structure of FIGS. 2 and 3 is based on the above assumptions. However, the structure of the stator 40 is not limited to the structure shown in FIGS. 2 and 3. The unit element number "m" and the cycle unit number "N" may be changed depending on a number of phase of alternating current, a number of winding groups and so on.

An inside structure of the stator core of the stator 40 will be explained. Multiple magnetic pole teeth 47 are formed in the stator core in such a way that each of the magnetic pole teeth 47 extends from the back-yoke portion 45 of the stator 40 in a radial-inward direction and the magnetic pole teeth 47 are arranged in the circumferential direction at equal intervals. The stator coil 55 is wound on each of the magnetic pole teeth 47. The stator coil 55 is wound on the magnetic pole teeth 47, for example, by use of segment-type conductors by a so-called SC-winding method. A slot 48 is respectively formed in the circumferential direction between neighboring magnetic pole teeth 47. The rotor 60 is movably accommodated in the inside of the stator 40 in such a way that there is a gap in the radial direction between the outer peripheral surface of the rotor 60 and an inner surface of a front end (a radial-inside end) of each magnetic pole tooth 47. In FIG. 2, the stator coil 55 and the rotor 60 are respectively indicated by dotted lines and two-dot-chain lines.

In the present embodiment shown in FIGS. 2 and 3, the magnetic pole teeth 47 having a number equal to the total number of the projecting portions 41 and the stopper portions 44 (12 in the present embodiment) are formed in the stator core of the stator 40. However, multiple magnetic pole teeth 47 may be alternatively formed for each of the projecting portion 41 and the stopper portion 44. A connecting portion 46, which is formed in the circumferential boundary portion between the projecting portion 41 and the stopper portion 44, will be explained below with reference to FIG. 5.

Figure 5:
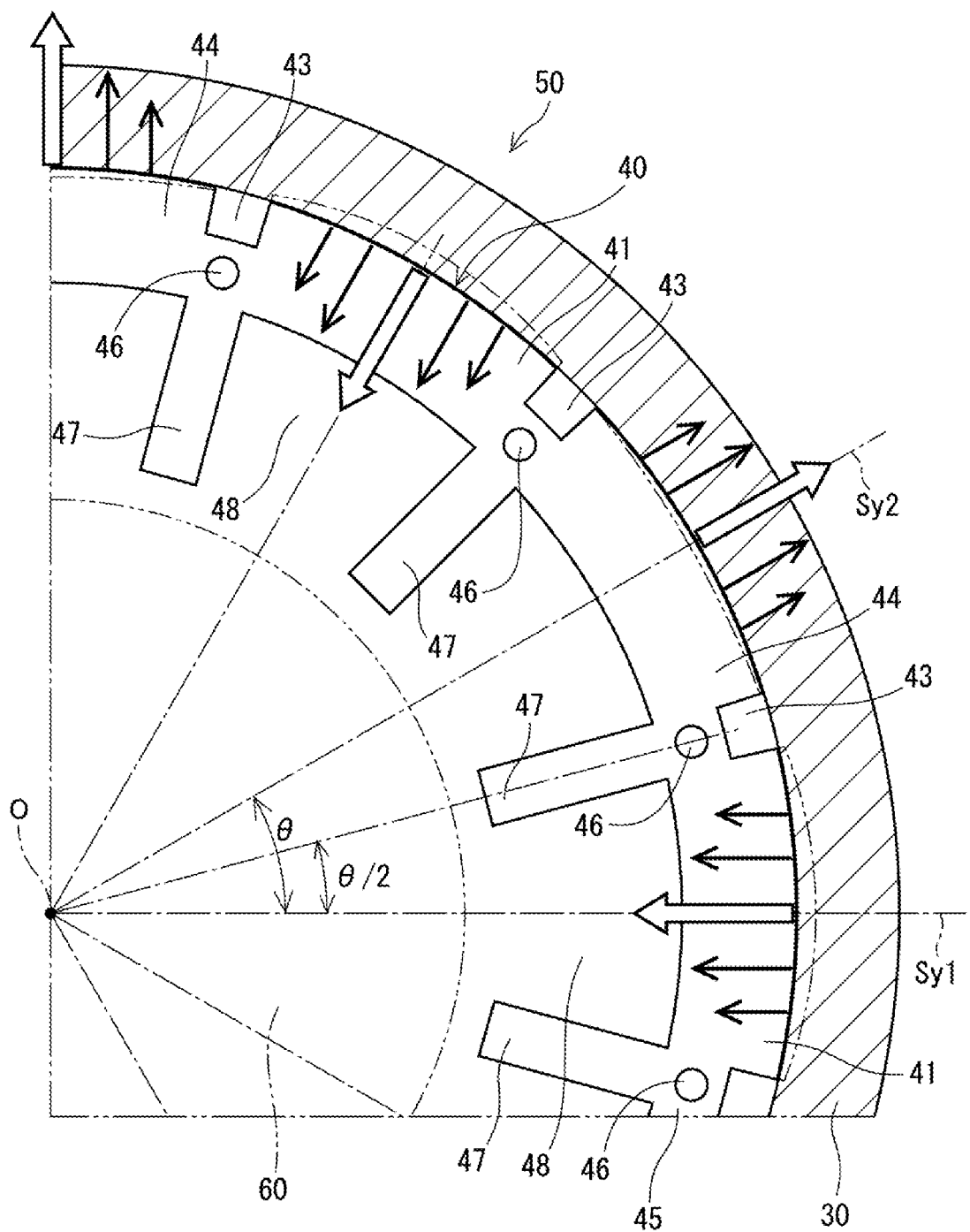
FIG. 5 is a schematically enlarged view showing a part of the stator after it is assembled to the motor housing by the interference fitting process.

A deformation of the stator core of the stator 40, which may be caused by the interference fitting process, will be explained with reference to FIG. 5. Multiple arrows are indicated in FIG. 5, each size of which is sensuously indicated. The projecting portion 41 of the back-yoke portion 45 is deformed in the radial-inward direction by the interference fitting process, while the stopper portion 44 is deformed in the radial-outward direction. An amount of the deformation is maximized at the circumferential center of each projecting portion 41 and each stopper portion 44. The amount of the deformation is gradually decreased in the circumferential direction from the circumferential center to each of circumferential side portions, respectively in the projecting portion 41 and the stopper portion 44. When the stopper portion 44 is brought into contact with the motor housing 30, the further deformation of the stator core becomes substantially zero.

Each of the outer peripheral lines of the projecting portion 41 and the stopper portion 44 has the arc shape. The curvature radius R1 of the projecting portion 41 has a function for uniformalizing the outer peripheral stress applied to the motor housing 30. The curvature radius R2 of the stopper portion 44 has a function for making the whole outer peripheral surface of the stopper portion 44 to be brought into contact with the inner peripheral wall of the motor housing 30, so that the outer peripheral stress applied to the motor housing 30 may not become inhomogeneous when the stopper portion 44 is brought into contact with the inner peripheral wall of the motor housing 30. Therefore, each of the curvature radius R1 of the projecting portion 41 and the curvature radius R2 of the stopper portion 44 is set at such a value, which is different from each other. It is preferable that a point extended in the circumferential direction from the outer peripheral line of the projecting portion 41 and a point extended in the circumferential direction from the outer peripheral line of the stopper portion 44 are closely located to each other, as much as possible. The above two points are located in the circumferential boundary portion between the projecting portion 41 and the stopper portion 44, in order that the outer peripheral stress applied to the motor housing 30 is reduced in the circumferential boundary portion. It is most preferable that the above point for the projecting portion 41 and the above point for the stopper portion 44 coincide with each other. The above points will be further explained below in connection with FIG. 8.

The multiple stator core sheets 401 to 406 are connected to one another in the axial direction at the respective connecting portions 46 by a swaging process, a welding process or the like. The connecting portion 46 is preferably formed in the circumferential boundary portion between the projecting portion 41 and the stopper portion 44, because the amount of the deformation of the back-yoke portion 45 is considered as being minimized in the circumferential boundary portion. Each of the connecting portions 46 is located at a position, which is displaced in the circumferential direction from the circumferential center of the projecting portion 41 by a half of the shift angle "θ". The connecting portions 46 are arranged at equal intervals of the shift angle "θ" (30° in the present embodiment).

In a case that the connecting portion 46 is located at a position other than the circumferential boundary portion, the deformation of the stator 40 is restricted. Therefore, the effect for uniformalizing the outer peripheral stress applied to the motor housing 30 by use of the deformation of the projecting portion 41 and the deformation of the stopper portion 44 may be decreased. When each of the connecting portions 46 is formed at the position in the circumferential boundary portion, like the present embodiment, the effect for uniformalizing the outer peripheral stress can be increased.

A relationship between an outer diameter of the stator 40 and a temperature for the shrink fitting process as well as a relationship between an inner diameter of the motor housing 30 and the temperature for the shrink fitting process will be explained with reference to FIG. 6A. In the present embodiment, the linear expansion coefficient of the material (ADC12) for the motor housing 30 is "$21 \times 10^{-6}$", while the linear expansion coefficient of the material (the magnetic steel sheet) for the stator core of the stator 40 is "$13 \times 10^{-6}$". As above, the linear expansion coefficient of the material for the motor housing 30 is different from that for the stator core of the stator 40. More exactly, the linear expansion coefficient of the material for the motor housing 30 is larger than that for the stator 40.

Figure 6A:
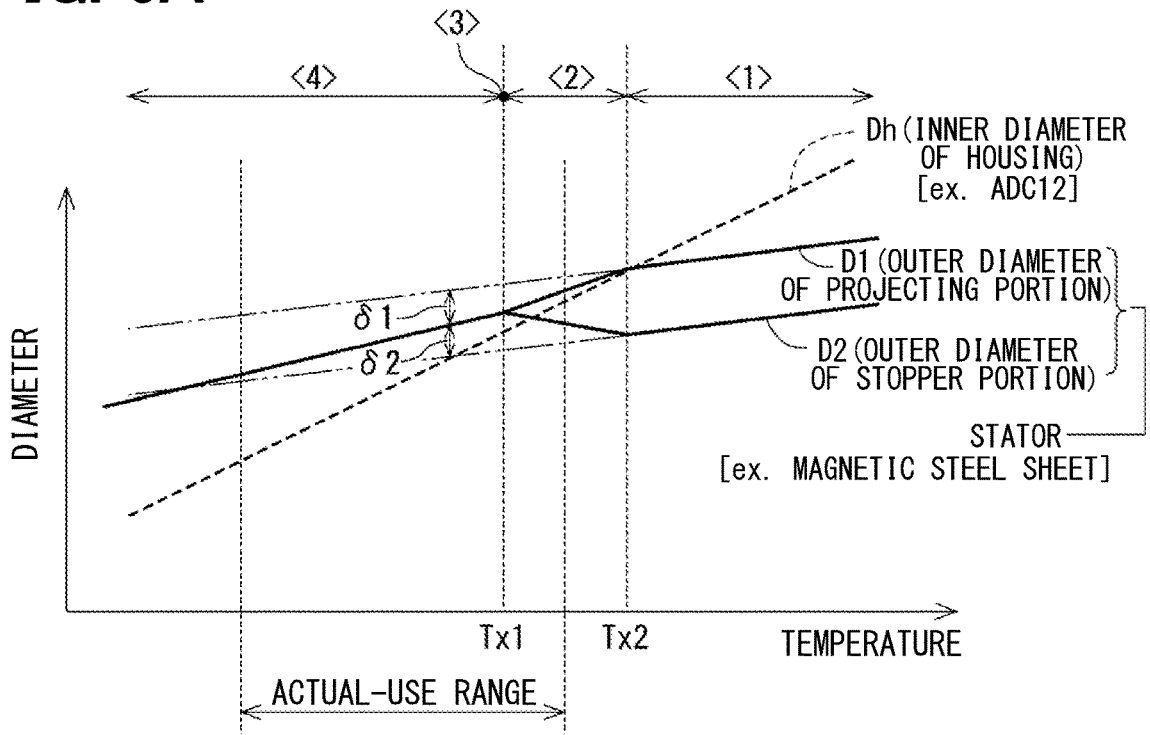
FIG. 6A is a graph for explaining differences of linear expansion coefficient between the motor housing and the stator.

In FIG. 6A, a horizontal line indicates the temperature, while a vertical line indicates a diameter of the respective parts. A first changeover temperature Tx1 is a temperature within an actual-use range, while a second changeover temperature Tx2 is a temperature higher than an upper-limit temperature of the actual-use range (Tx2>Tx1). In the present disclosure, a temperature range higher than the second changeover temperature Tx2 is defined as a first temperature range <1>, a temperature range between the first changeover temperature Tx1 and the second changeover temperature Tx2 is defined as a second temperature range <2>, the first changeover temperature Tx1 is defined as a third temperature range <3>, and a temperature range lower than the first changeover temperature Tx1 is defined as a fourth temperature range <4>.

In the temperature ranges <2>, <3> and <4>, each of a dotted line for the inner diameter Dh of the motor housing 30, a two-dot-chain line for the outer diameter D1 of the projecting portion 41 and a two-dot-chain line for the outer diameter D2 of the stopper portion 44 is a virtual line for the diameter of the respective parts, wherein each of the diameters is measured in a single body condition of the respective parts. A solid line shows the diameter in a condition that the stator 40 is fixed to the motor housing 30 by the shrink fitting process. In the fourth temperature range <4>, the tightening margin between the stator 40 and the motor housing 30 becomes relatively smaller when the temperature becomes higher.

In the first temperature range <1>, each of the projecting portion 41 and the stopper portion 44 is not in contact with the motor housing 30. In the second temperature range <2>, only the projecting portion 41 is in contact with the motor housing 30. When the temperature decreases in the second temperature range <2>, the projecting portion 41 is deformed in the radial-inward direction, while the stopper portion 44 is deformed in the radial-outward direction. The inner diameter of the motor housing 30 is thereby increased, when compared with the dotted line. The inner diameter of the motor housing 30 in a shrink-fitted condition (below the second changeover temperature Tx2) has an intermediate value (the solid line) between the inner diameter (the dotted line) of the motor housing 30 in the case of the single body condition of the motor housing and the outer diameter (the two-dot-chain line) of the projecting portion 41 in the case of the single body condition of the stator.

In the third temperature range <3>, namely at the first changeover temperature Tx1, the solid line of the outer diameter D1 of the projecting portion 41 intersects with the solid line of the outer diameter D2 of the stopper portion 44. Then, the stopper portion 44 is brought into contact with the motor housing 30. In this condition, a deformation amount "δ1" of the projecting portion 41 and a deformation amount "δ2" of the stopper portion 44 are almost equal to each other. In the fourth temperature range <4>, both the projecting portion 41 and the stopper portion 44 are in contact with the motor housing 30. In this temperature range, the stator core of the present embodiment has the function, which is equal to the function of a stator core (a comparative example) having an exact circular shape.

More exactly, a part of the second temperature range <2> (a highest temperature range of the actual-use range), which corresponds to a range between the first changeover temperature Tx1 and the upper-limit value of the actual-use range, corresponds to such a temperature range in which the tightening margin between the motor housing 30 and the stator 40 becomes smaller. In this highest temperature range, the stopper portion 44 is not yet in contact with the motor housing 30.

An inclination of the solid line for the outer diameter D1 of the projecting portion 41 in the second temperature range <2> is larger than that in the fourth temperature range <4>. The following points are considered as reasons for the above different inclinations of the outer diameter D1:

In the second temperature range <2>, only the projecting portion 41 is in contact with the motor housing 30. Therefore, the second temperature range <2> corresponds to a transient region for the deformation of the motor housing 30 and the stator 40. The outer diameter of the projecting portion 41 is more easily changed. On the other hand, the fourth temperature range <4> corresponds to a deformation region, in which a difference of the outer diameter between the projecting portion 41 and the stopper portion 44 is changed. The outer diameter of the stator 40 and the inner diameter of the motor housing 30 is not easily changed in the shrink-fitted condition, when compared with the second temperature range <2>.

When the solid line of the fourth temperature range <4> is extended in the direction to a high-temperature side, the solid line overlaps with the dotted line Dh of the inner diameter of the motor housing 30 in the actual-use range. In the case of the comparative example having the stator core of the exact circle, a tightening force becomes zero in the heist temperature range of the actual-use range, which is higher than the first changeover temperature Tx1. According to the present embodiment, however, the tightening force does not become zero in the highest temperature range, because the deformation of the projecting portion 41 as well as the deformation of the stopper portion 44 is released from its restriction. As a result, the actual-use range of the present embodiment can be made broader than that for the comparative example having the stator core of the exact circle.

The present embodiment may be modified in the following manner. For example, the linear expansion coefficient of the material for the motor housing 30 is made to be smaller than that for the stator 40. The stator 40 is fixed to the motor housing 30 by the cooling fitting process. In such a modification, a dimensional relationship between the motor housing 30 and the stator 40 becomes an opposite relationship shown in FIG. 6A. In other words, the first changeover temperature is set at a value, which is lower than a lower-limit value of the actual-use range.

Figure 6B:
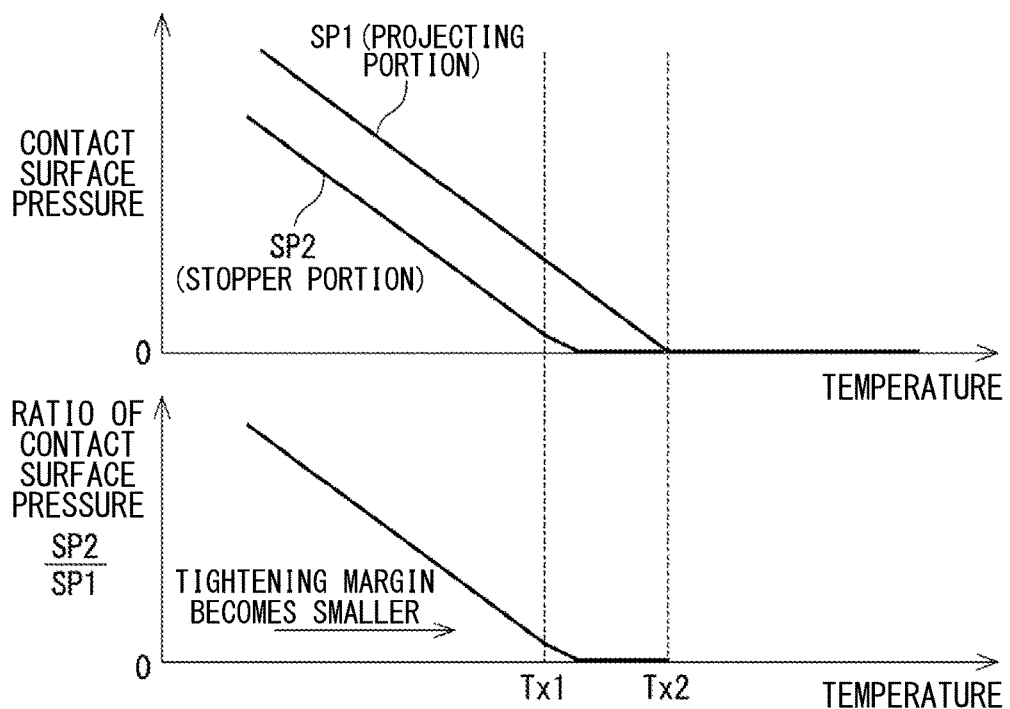
FIG. 6B is a graph showing a relationship between a contact surface pressure and temperature for each of a projecting portion and a stopper portion.

FIG. 6B shows a relationship between the temperature and a first contact surface pressure SP1 between the projecting portion 41 and the motor housing 30 and a relationship between the temperature and a second contact surface pressure SP2 between the stopper portion 44 and the motor housing 30. In the fourth temperature range <4>, in which both the projecting portion 41 and the stopper portion 44 are in contact with the motor housing 30, each of the first and the second contact surface pressures SP1 and SP2 is larger than 0 (zero). In the temperature range (including the first temperature range <1>), in which neither the projecting portion 41 nor the stopper portion 44 is in contact with the motor housing 30, each of the first and the second contact surface pressures SP1 and SP2 becomes 0 (zero). In the fourth temperature range <4>, a ratio (SP2/SP1) of the second contact surface pressure SP2 with respect to the first contact surface pressure SP1 becomes smaller, as the temperature is increased. In other words, a back-up effect of the stopper portion 44 is gradually decreased, as the temperature is increased.

Figure 7:
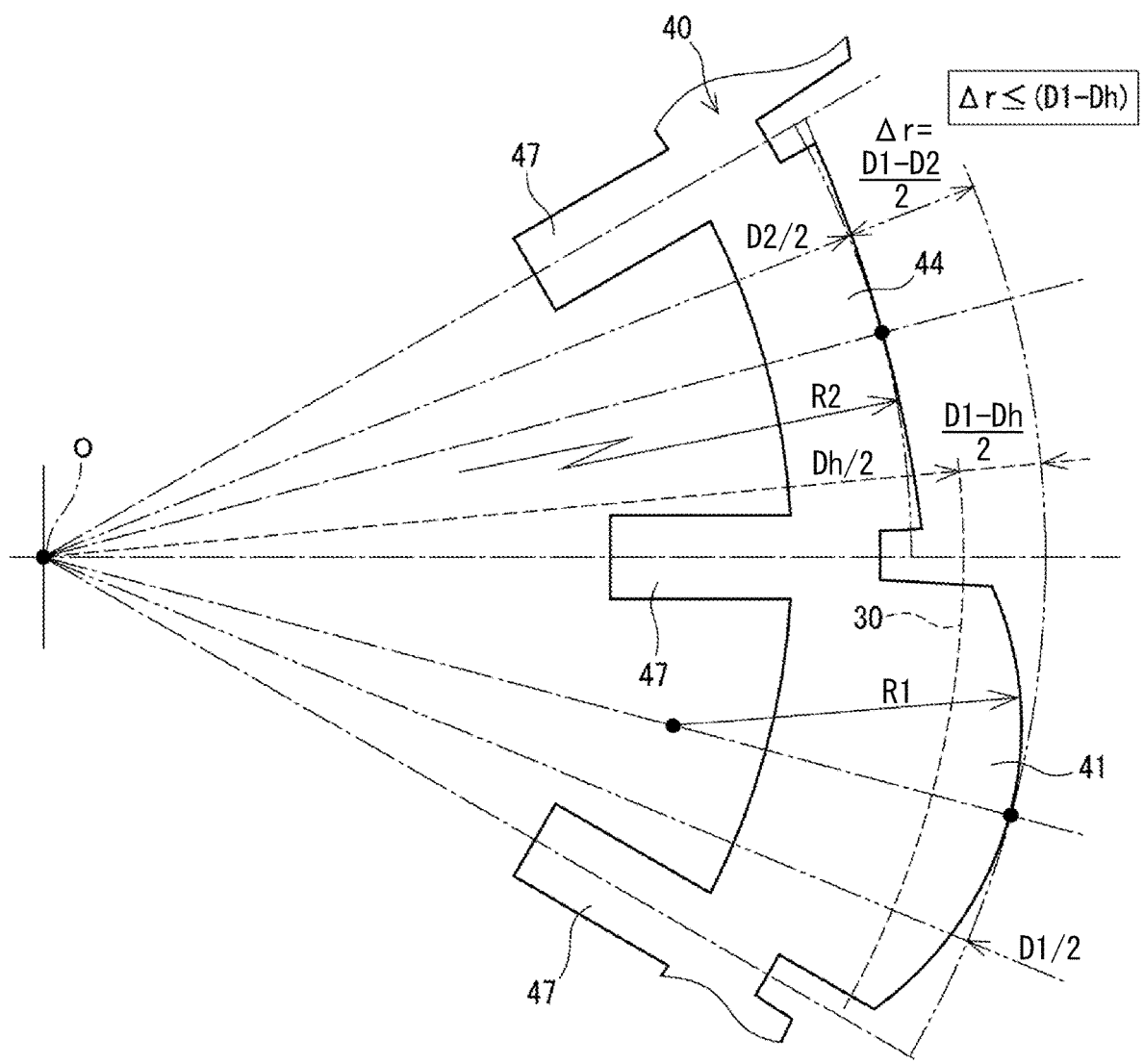
FIG. 7 is a schematic view for explaining a relationship between a tightening margin and a radius difference ($\Delta r$) between the projecting portion and the stopper portion.
Figure 8:
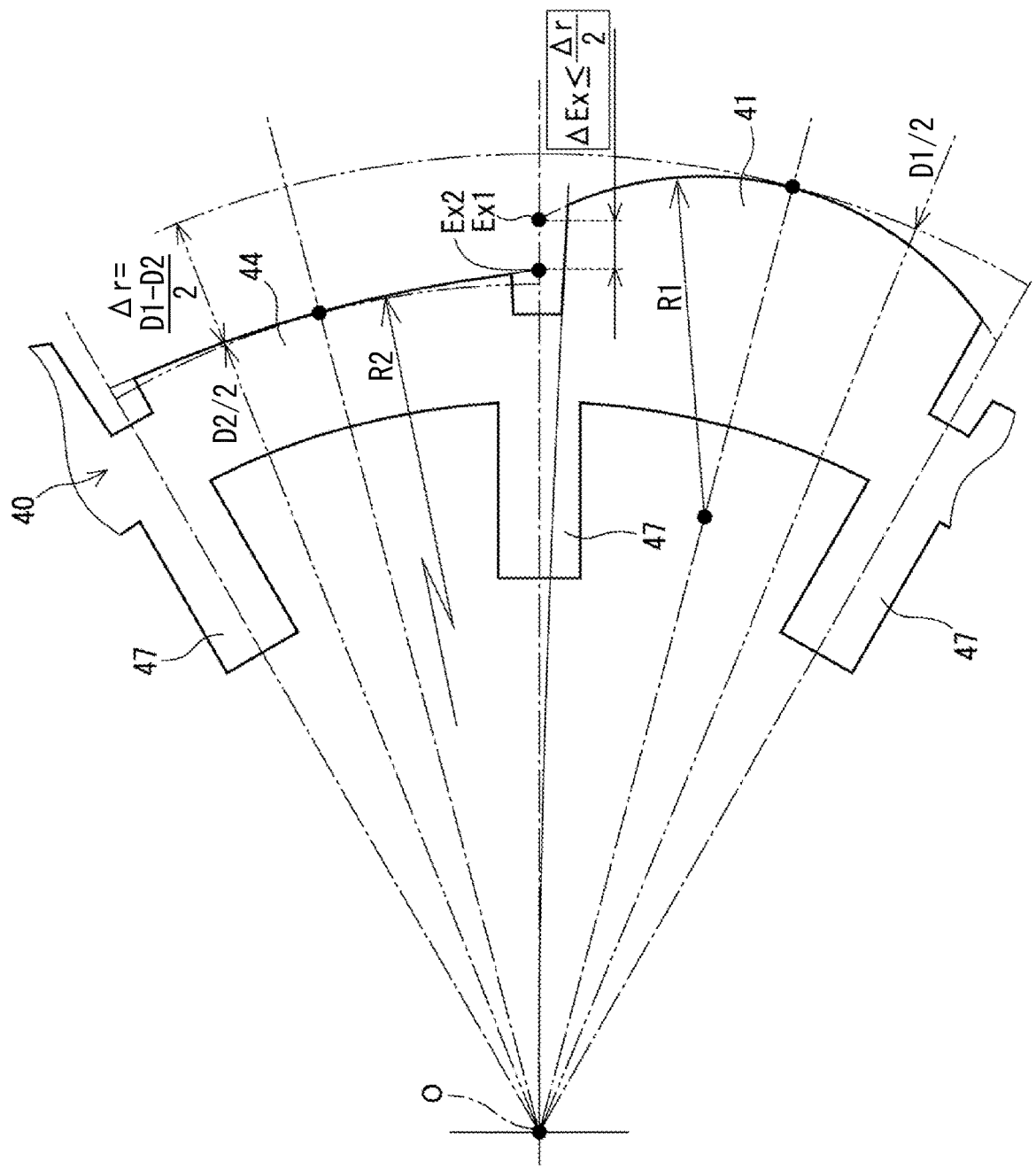
FIG. 8 is a schematic view for explaining a radial distance ($\Delta Ex$) between an extended point of an outer peripheral line of the projecting portion and an extended point of an outer peripheral line of the stopper portion.

A preferable dimensional condition for the projecting portion 41 and the stopper portion 44 will be explained with reference to FIGS. 7 and 8. In FIGS. 7 and 8, the curvature radius of the arc portion is exaggerated for the purpose of easily understanding a relationship between the curvature radius R1 of the projecting portion 41 and the radius (D1/2) of the circumscribed circle thereof as well as a relationship between the curvature radius R2 of the stopper portion 44 and the radius (D2/2) of the inscribed circle thereof.

In the present disclosure, a difference "Δr" between the curvature radius R1 of the projecting portion 41 and the curvature radius R2 of the stopper portion 44 is defined as a radius difference "Δr". A preferable relationship between the radius difference "Δr" and the tightening margin will be explained with reference to FIG. 7. The tightening margin corresponds to the difference between the outer diameter D1 of the circumscribed circle of the projecting portion 41 and the inner diameter Dh of the motor housing 30. A half of the tightening margin, which is equal to the "tightening margin/2" at one side of the radial direction, is indicated by "(D1−Dh)/2".

In a case that the radius difference "Δr" is too large, the stopper portion 44 is not brought into contact with the motor housing 30 in the shrink fitting process and a gap may be formed in the radial direction between the stopper portion 44 and the motor housing 30. It is necessary to satisfy a condition that the radius difference "Δr" is smaller than a double of "the tightening margin/2" (that is, Δr"≤(D1−Dh)), so that the stopper portion 44 is brought into contact with the motor housing 30.

For example, when the tightening margin is 0.2 mm, the outer diameter D1 of the circumscribed circle of the projecting portion 41 is contracted by 0.2 mm by the shrink fitting process. In this contraction, the stopper portion 44 is deformed in the radial-outward direction by a corresponding amount. When the stopper portion 44 is brought into contact with the motor housing 30, the further deformation in the radial-outward direction is stopped. When the further deformation of the stopper portion 44 is stopped, each of the diameter of the projecting portion 41 and the stopper portion 44 is deformed by 0.2 mm. Therefore, an initial diameter difference (D1−D2) is 0.4 mm, while the radius difference "Δr" is 0.2 mm. In other words, the initial radius difference "Δr" is equal to the tightening margin. If the radius difference "Δr" is larger than the tightening margin, the stopper portion 44 is not brought into contact with the motor housing 30.

A condition that the circumferential end of the projecting portion 41 and the circumferential end of the stopper portion 44 are smoothly connected to each other in the circumferential direction will be explained with reference to FIG. 8.

The point, which is located on an extended line of the outer peripheral line of the projecting portion 41, which is located in the circumferential boundary portion between the projecting portion 41 and the stopper portion 44, and which is displaced from the circumferential center of the projecting portion 41 by "the shift angle θ/2", is defined as a first extended point Ex1 for the outer peripheral line of the projection portion 41. In a similar manner, the point, which is located on an extended line of the outer peripheral line of the stopper portion 44, which is located in the circumferential boundary portion between the projecting portion 41 and the stopper portion 44, and which is displaced from the circumferential center of the stopper portion 44 by "the shift angle θ/2", is defined as a second extended point Ex2 for the outer peripheral line of the stopper portion 44. A distance in the radial direction between the first extended point Ex1 and the second extended point Ex2 is defined as a radial distance "ΔEx". In a case that the curvature radius R1 of the projecting portion 41 is equal to the radius (D1/2) of the circumscribed circle of the projecting portion 41 and the curvature radius R2 of the stopper portion 44 is equal to the radius (D2/2) of the inscribed circle of the stopper portion 41, a maximum value of the radial distance "ΔEx" is equal to the radius difference "Δr".

Therefore, the radial distance "ΔEx" between the first extended point Ex1 and the second extended point Ex2 is preferably limited to a value, which is equal to or smaller than a half of the radius difference "Δr". In other words, each of the radius difference "Δr", the first curvature radius R1 and the second curvature radius R2 is set to satisfy a condition of "ΔEx≤(Δr/2)". According to the above structure and the condition, it is possible to avoid a situation that the outer peripheral stress "σh" applied to the motor housing is increased at the circumferential boundary portion between the projecting portion 41 and the stopper portion 44.

Figure 9:
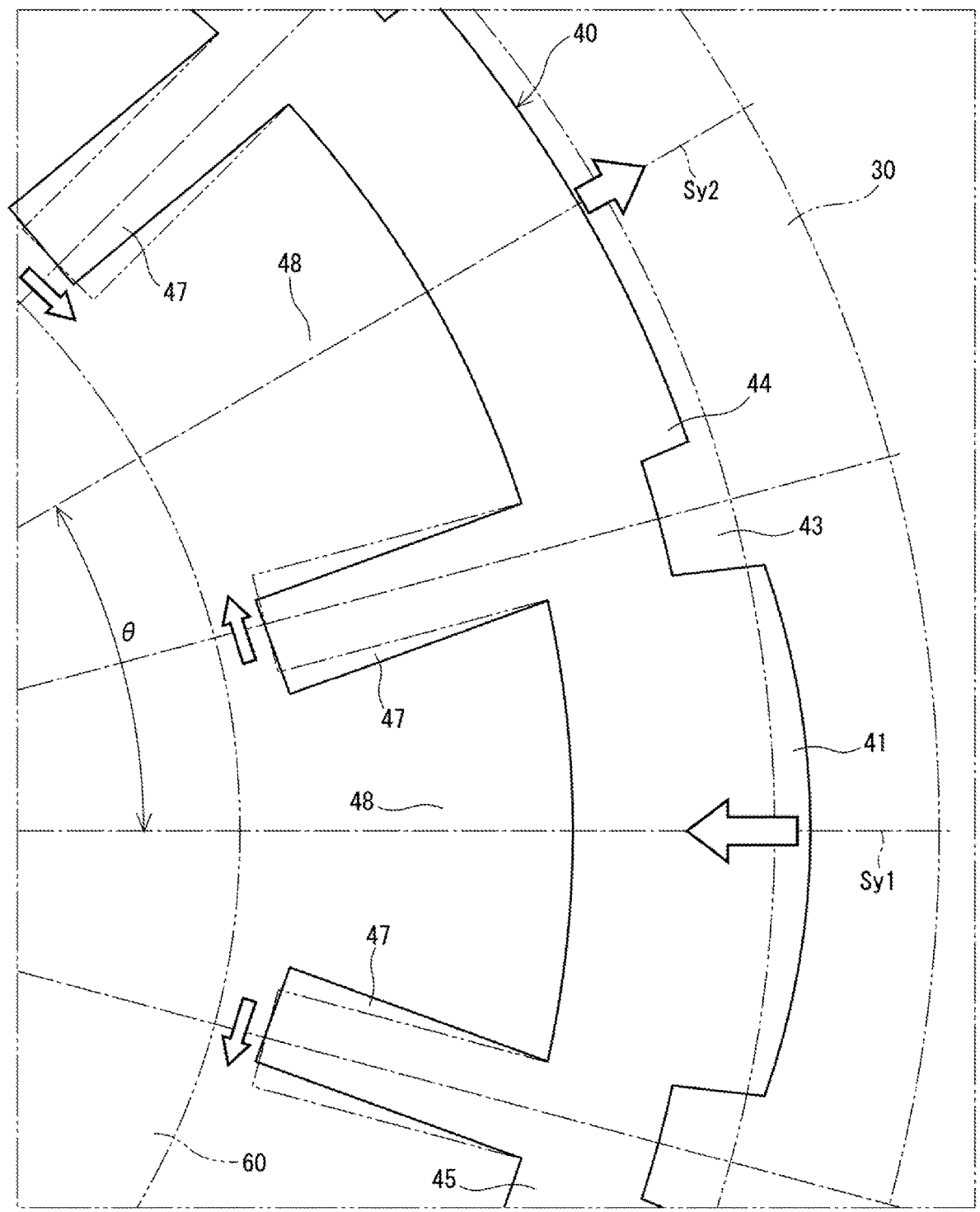
FIG. 9 is a schematically enlarged view showing magnetic pole teeth, which are deformed in a circumferential direction by the interference fitting process.
Figure 10:
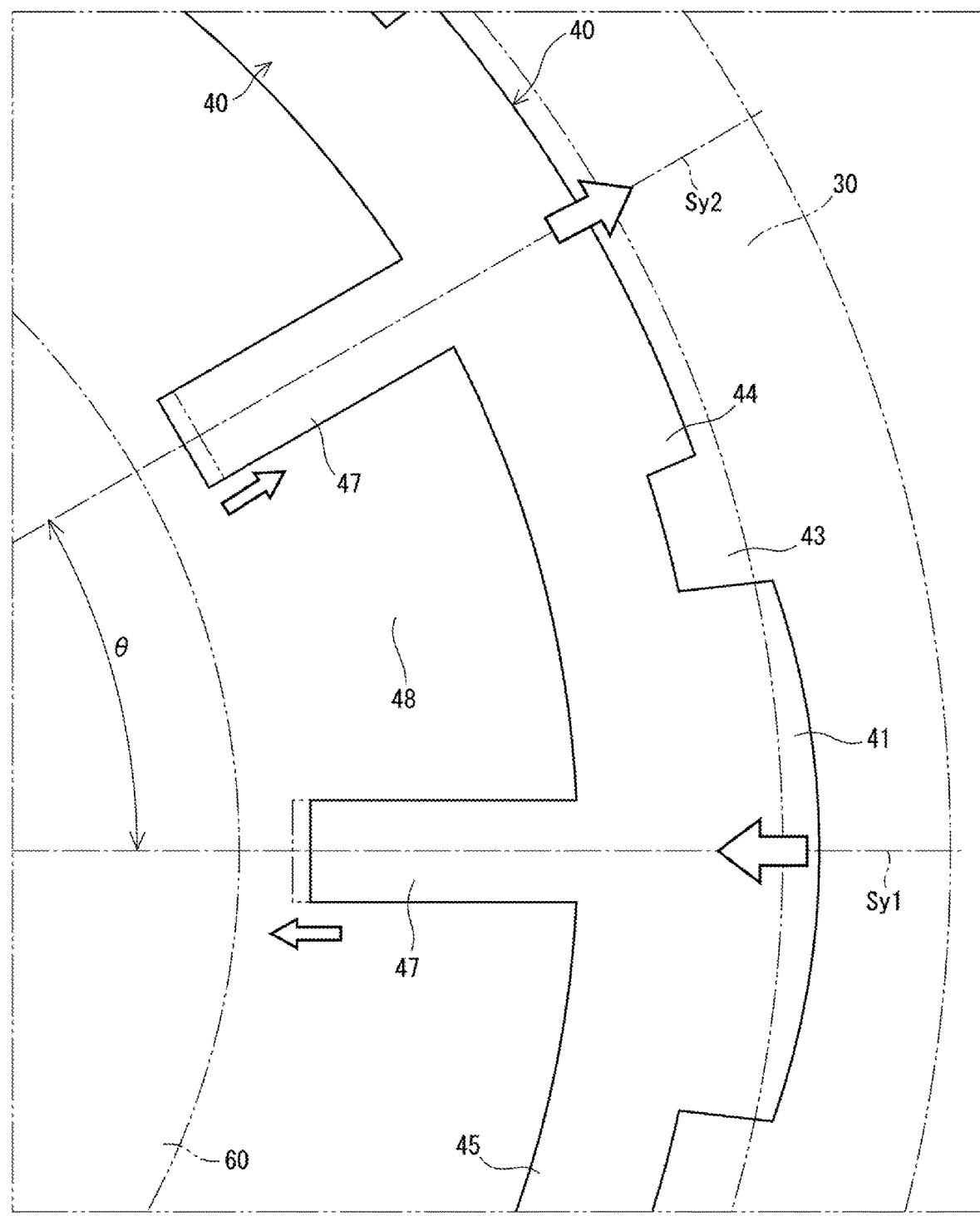
FIG. 10 is a schematically enlarged view showing magnetic pole teeth, which are deformed in a radial direction by the interference fitting process.

Positions for the magnetic pole teeth 47, which are formed in the stator core, will be explained with reference to FIGS. 9 and 10. In FIGS. 9 and 10, the connecting portions 46 are omitted. When the stator 40 is shrink-fitted to the motor housing 30, not only the back-yoke portion 45 of the annular shape is deformed but also the magnetic pole teeth 47, each of which extends from the back-yoke portion 45 in the radial-inward direction, are deformed. The solid line indicates a position of each magnetic pole tooth 47, before the stator 40 is shrink-fitted to the motor housing 30. The two-dot-chain line indicates the position of each magnetic pole tooth 47, after the stator 40 is shrink-fitted to the motor housing 30.

As shown in FIG. 9, in the stator 40, each of the magnetic pole teeth 47 is formed in the circumferential boundary portion between the projecting portion 41 and the stopper portion 44. A teeth width is formed between the neighboring magnetic pole teeth 47, which are formed at both circumferential sides of the circumferential center of the projecting portion 41 and extending in the radial-inward direction from each circumferential side end of the projecting portion 41.

The teeth width for the projecting portion 41, that is a width of the slot 48 for the projecting portion 41 in the circumferential direction, is increased by the shrink fitting process. In particular, in the stator 40 for which the stator coil 55 (not shown in FIG. 9) is wound by a distribution winding method (in particular, by the SC winding method), the stator coil 55 may be released by vibration or the like.

On the other hands, the teeth width between the neighboring magnetic pole teeth 47 formed at both circumferential sides of the circumferential center of the stopper portion 44 and extending in the radial-inward direction from each circumferential side end of the stopper portion 44, that is, the width of the slot 48 for the stopper portion 44 in the circumferential direction, is decreased by the shrink fitting process. In the present embodiment, the teeth width is also referred to as a slot width. When the slot width for the stopper portion 44 is decreased, load may be applied to the stator coil 55 of the stator 40, for which the stator coil 55 is wound by the distribution winding method (in particular, by the SC winding method).

It is, therefore, preferable that each of the magnetic pole teeth 47 (more exactly, each radial-inner end of the magnetic pole tooth) is formed at such an initial circumferential position before the shrink fitting process, in order that each of the magnetic pole teeth 47 is located at a desired circumferential position (a target circumferential position) after the shrink fitting process. A circumferential direction, in which the magnetic pole tooth 47 is deformed during the shrink fitting process, is defined as a tooth deforming circumferential direction. An amount of the deformation of the magnetic pole tooth 47 (the radial-inner end of the magnetic pole tooth 47), which is deformed in the shrink fitting process in the tooth deforming circumferential direction, is defined as a tooth deforming circumferential amount. The initial circumferential position corresponds to a position, which is displaced by the tooth deforming circumferential amount from the desired circumferential position in the circumferential direction opposite to the tooth deforming circumferential direction.

More exactly, each of the magnetic pole teeth 47 is formed at the position indicated by the solid line in FIG. 9, in the single body condition of the stator core, that is before the shrink fitting process. Each of the magnetic pole teeth 47 is deformed by the shrink fitting process to the position indicated by the two-dot-chain line in FIG. 9 (that is, the desired circumferential position). The tooth deforming circumferential amount is adjusted in such a way that the teeth width between the neighboring magnetic pole teeth is controlled at a proper value. According to the above structure, it is possible to avoid the situation that the load is applied to the stator coil 55 and/or the stator coil 55 is released. It is possible to determine whether the stator coil 55 is properly wound in the stator 40, when the stator 40 is checked in a condition before the stator 40 is assembled to the motor housing 30.

In the structure of the stator core of the stator 40 shown in FIG. 10, which corresponds to a modification of the present embodiment, each of the magnetic pole teeth 47 is formed at the circumferential center of the projecting portion 41 and at the circumferential center of the stopper portion 44. In this modification, the deformation of each tooth in the circumferential direction becomes smaller, while the deformation of each tooth in the radial direction becomes larger. The magnetic pole tooth 47, which is formed at the circumferential center of the projecting portion 41, is deformed in the radial-inward direction by the shrink fitting process. The magnetic pole tooth 47, which is formed at the circumferential center of the stopper portion 44, is deformed in the radial-outward direction by the shrink fitting process. In particular, when the magnetic pole tooth 47 is deformed in the radial-inward direction, the radial gap between the forward end of the magnetic pole tooth 47 and the rotor 60 becomes smaller. Therefore, a risk for a possible contact between the stator and the rotor would be increased.

In a similar manner to the circumferential deformation explained with reference to FIG. 9, it is preferable that each of the magnetic pole teeth 47 is formed at such an initial radial position before the shrink fitting process, in order that each of the magnetic pole teeth 47 is located at a desired radial position after the shrink fitting process. A radial direction, in which the magnetic pole tooth 47 is deformed during the shrink fitting process, is defined as a tooth deforming radial direction. An amount of the deformation of the magnetic pole tooth 47, which is deformed in the shrink fitting process in the tooth deforming direction, is defined as a tooth deforming radial amount. The initial radial position corresponds to a position, which is displaced by the tooth deforming radial amount from the desired radial position in the radial direction opposite to the tooth deforming radial direction.

More exactly, each of the magnetic pole teeth 47 is formed at the position indicated by the solid line in FIG. 10, in the single body condition of the stator core before the shrink fitting process. Each of the magnetic pole teeth 47 is deformed by the shrink fitting process to the position indicated by the two-dot-chain line in FIG. 10 (that is, the desired radial position). According to the above structure, it is possible to avoid the situation that the risk for the possible contact between the stator and the rotor would be increased. It is also possible to determine whether the stator coil 55 is properly wound in the stator 40, when the stator 40 is checked in the condition before the stator 40 is assembled to the motor housing 30.

Figure 11A:
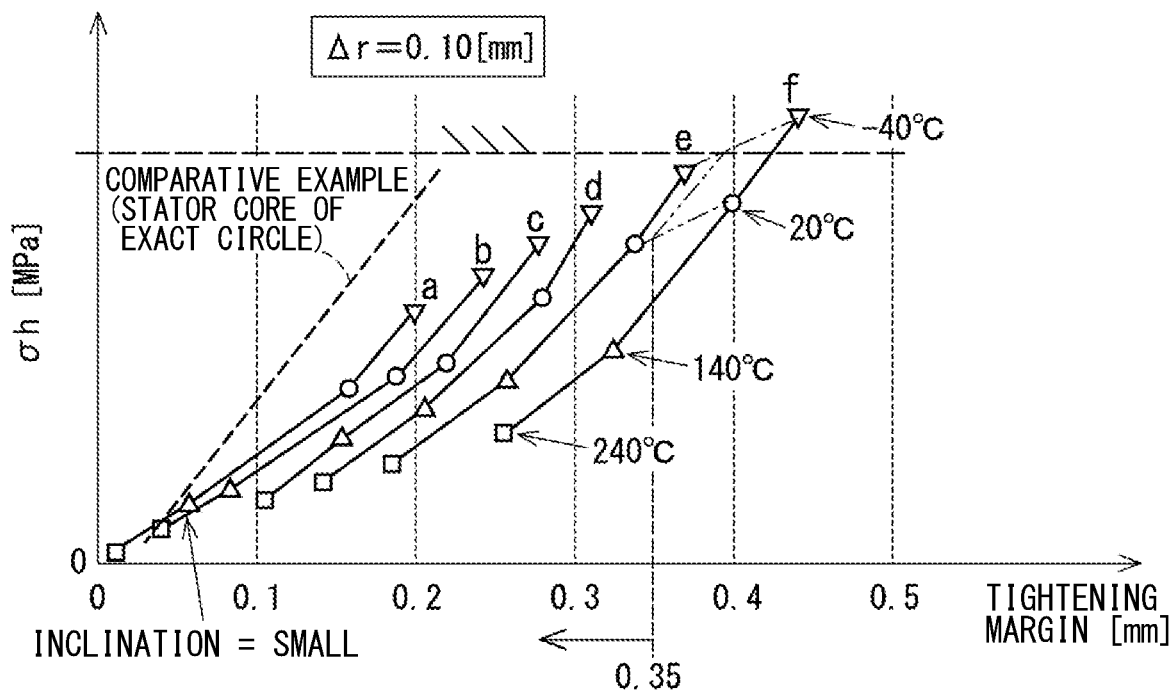
FIG. 11A is a graph showing a relationship between the tightening margin and the outer peripheral stress applied to the motor housing.
Figure 11B:
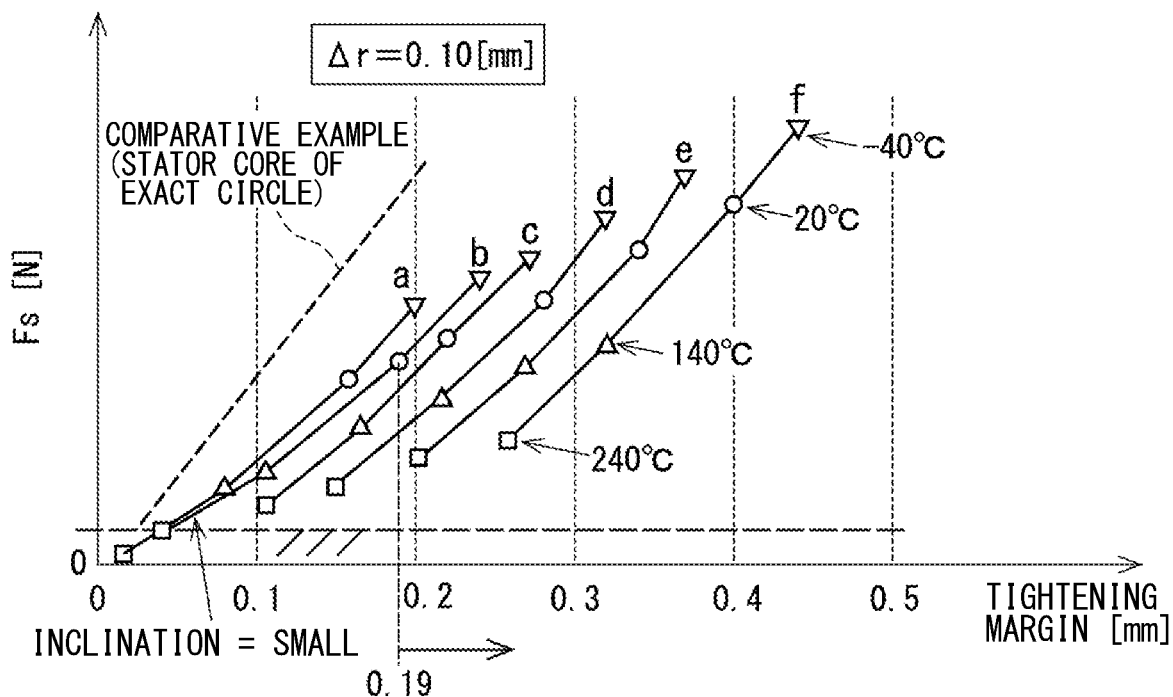
FIG. 11B is a graph showing a relationship between the tightening margin and stator reaction force.

An influence of the tightening margin in the shrink fitting process will be explained with reference to FIGS. 11A, 11B, 12A and 12B. FIG. 11A shows a relationship among the tightening margin, the temperature and the outer peripheral stress "σh" applied to the motor housing, in the case that the stator core has the radius difference "Δr" of 0.1 mm between the projecting portion 41 and the stopper portion 44. FIG. 11B shows a relationship among the tightening margin, the temperature and a stator reaction force "Fs", in the case that the stator core has the same radius difference "Δr" of 0.1 mm. As shown in FIG. 7, the tightening margin is defined as the difference between the outer diameter D1 of the circumscribed circle of the projecting portion 41 and the inner diameter Dh of the motor housing 30. The contraction amount of the projecting portion 41 at one side of the radial direction corresponds to the half of the tightening margin.

The tightening margin at the temperature of 20° C. is defined as an initial value of the tightening margin. Six samples "a" to "f" are shown in FIGS. 11A and 11B. Each of the initial values of the tightening margin for those samples is 0.16 mm, 0.19 mm, 0.22 mm, 0.28 mm, 0.34 mm and 0.40 mm. In each of the samples "a" to "f" of FIG. 11A, each of the outer peripheral stresses "σh" applied to the motor housing at the respective temperatures of −40° C., 20° C., 140° C. and 240° C. is indicated by each of symbols of a down-pointing triangle, a circle, an up-pointing triangle and a square. In a similar manner, in each of the samples "a" to "f" of FIG. 11B, each of the stator reaction forces "Fs" at the respective temperatures of −40° C., 20° C., 140° C. and 240° C. is indicated by each of the symbols of the down-pointing triangle, the circle, the up-pointing triangle and the square. Each of the data at the temperature of 240° C. is obtained by converting an expansion portion by a creep and aging based on data at the temperature of 140° C. The tightening margin becomes smaller when the temperature is increased.

A horizontal line in each of FIGS. 11A and 11B shows values for the tightening margin, which belongs to a range generally supposed by a person skilled in the art based on its common knowledge. A vertical line in FIGS. 11A and 11B respectively shows the outer peripheral stress "σh" applied to the motor housing and the stator reaction force "Fs". However, actual values are not indicated in the vertical lines. A dotted line in each of FIGS. 11A and 11B shows a value for the comparative example (the stator core having the exact circle), in which the projecting portions and the stopper portions are not formed at the outer periphery of the stator core.

An inclination of each characteristic line in each of FIGS. 11A and 11B shows a sensitivity of the outer peripheral stress "σh" with respect to a change of the tightening margin and a sensitivity of the stator reaction force "Fs" with respect to the change of the tightening margin. In the samples "e" and "f", each initial value of the tightening margin at the temperature of 20° C. is larger than 0.34 mm. The inclination of each solid line for the samples "e" and "f" is almost equal to the inclination of the dotted line for the comparative example (the stator core having the exact circle). Therefore, the sensitivity is almost the same between the dotted line and the solid lines for the samples "e" and "f". The inclination of each solid line for the samples "a" and "b", the initial tightening margin of which is smaller than 0.22 mm, is smaller than the inclination of the dotted line for the comparative example (the stator core having the exact circle). The sensitivity of the outer peripheral stress "σh" as well as the sensitivity of the stator reaction force "Fs" with respect to the change of the tightening margin becomes lower in the samples "a" and "b".

An upper-limit value for the tightening margin is decided based on an upper-limit value for the outer peripheral stress "σh" applied to the motor housing 30 in FIG. 11A, which would prevent breaking of the motor housing 30. In the present embodiment, the 0.2-percent withstanding force of the material (ADC12) for the motor housing 30 corresponds to 150 MPa. A value, which is obtained by multiplying 150 MPa with a safety ratio, is decided as the upper-limit value for the outer peripheral stress "σh". In the sample "e", the initial tightening margin at the temperature of 20° C. is 0.34 mm and the outer peripheral stress "σh" at the temperature of −40° C. is lower than the upper-limit value for the outer peripheral stress (indicated by a horizontal dotted line in FIG. 11A). On the other hand, in the sample "f", the initial tightening margin at the temperature of 20° C. is 0.4 mm but the outer peripheral stress "σh" at the temperature of −40° C. is higher than the upper-limit value for the outer peripheral stress "σh". Considering those samples, the upper-limit value for the initial tightening margin is decided as 0.35 mm.

A lower-limit value for the tightening margin is decided based on a lower-limit value for the stator reaction force "Fs" in FIG. 11B, which would satisfy a connecting force (a connecting strength). The connecting force corresponds to a value, which is obtained when multiplying the stator reaction force "Fs" in the radial direction by friction coefficient. For example, the stator reaction force "Fs" is set as a value, which can resist an impact load. In a case of the sample "b", in which the initial tightening margin at the temperature of 20° C. is 0.19 mm, the stator reaction force "Fs" at the temperature of 240° C. coincides with the lower-limit value for the stator reaction force "Fs" (indicated by a horizontal dotted line in FIG. 11B). As a result, 0.19 mm is decided as the lower-limit value for the initial tightening margin.

According to the above samples, a range for the tightening margin (which is a difference between the upper-limit value and the lower-limit value of the initial tightening margin) becomes 0.16 mm, in the case of the stator core having the radius difference of 0.1 mm (Δr=0.1 mm). The range for the tightening margin in the case of the stator core having the exact circle is 0.06 mm. Therefore, the range for the tightening margin for the stator core of the present embodiment is increased by 0.1 mm, when compared with the range for the tightening margin for the stator core having the exact circle. As above, it is possible to ease design tolerance and to thereby improve productivity. The other samples having different radius difference "Δr" are evaluated in the same manner as explained above. It is confirmed that the range for the tightening margin likewise becomes larger as the radius difference "Δr" is larger.

Figure 12A:
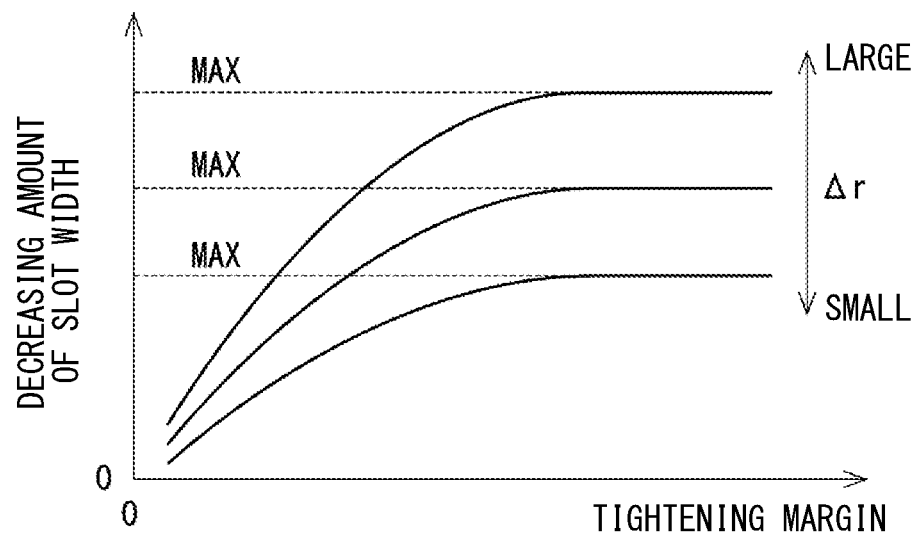
FIG. 12A is a graph showing a relationship between the tightening margin and a decreasing amount of a slot width.
Figure 12B:
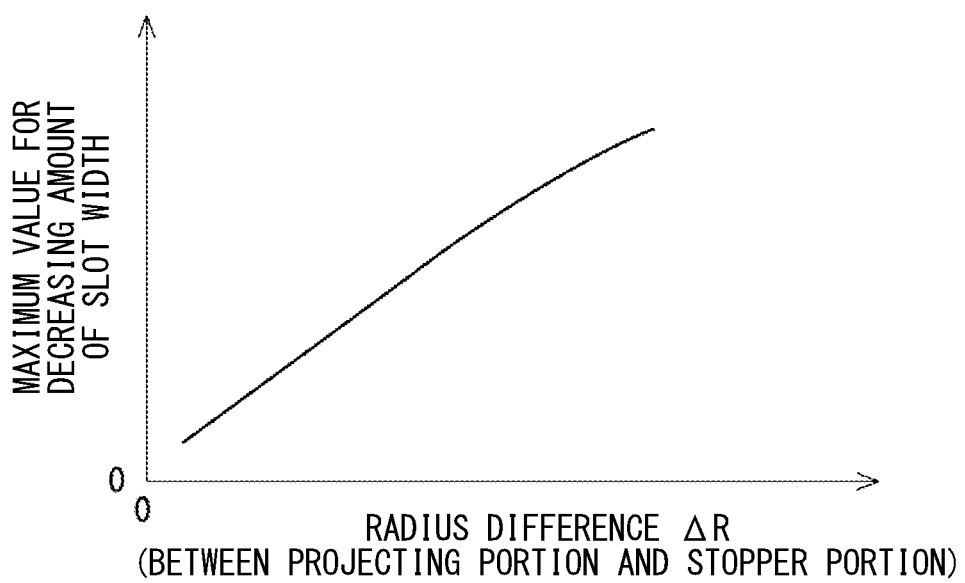
FIG. 12B is a graph showing a relationship between the radius difference (the radius difference "$\Delta r$" between the projecting portion and the stopper portion) and a maximum value of the decreasing amount of the slot width.

FIG. 12A shows a relationship between the tightening margin and a decreasing amount of the slot width (equal to the teeth width). FIG. 12B shows a relationship between the radius difference "Δr" (between the projecting portion 41 and the stopper portion 44) and a maximum value for the decreasing amount of the slot width. A decrease of the teeth width, which is caused by the deformation of the magnetic pole teeth 47 in the circumferential direction (FIG. 9), is quantified as the decreasing amount of the slot width. In each of the horizontal lines and the vertical lines of FIGS. 12A and 12B, specific values are not indicated. In the present disclosure, relative trends in connection with the horizontal and vertical lines will be explained.

As shown in FIG. 12A, in a first range closer to zero of the tightening margin, the decreasing amount of the slot width is increased in accordance with the increase of the tightening margin. On the other hand, in a second range, in which the tightening margin is larger than a predetermined value, the decreasing amount of the slot width is saturated. The decreasing amount of the slot width becomes constant at its maximum value in the second range. This is because the further deformation of the stator core is stopped by the stopper portion 44. As shown in FIGS. 12A and 12B, the maximum value for the decreasing amount of the slot width has a positive relation to the radius difference "Δr" between the projecting portion 41 and the stopper portion 44. In other words, it is possible to control the maximum value for the decreasing amount of the slot width, when the radius difference "Δr" is adjusted. It is considered based on the above result that the radius difference "Δr" is preferably made to be a value closer to zero in a viewpoint for suppressing the decrease of the slot width.

According to the above consideration, the radius difference "Δr" is preferably made to be a larger value in a viewpoint for increasing the tightening margin, but the radius difference "Δr" is preferably made to be the value closer to zero in the viewpoint for suppressing the decrease of the slot width. Therefore, in an actual design stage, it is important to decide the radial dimension for the projecting portion 41 and the stopper portion 44 based on a design policy, what takes precedence.

Mathematical formulas for the curvature radius R1 of the projecting portion 41 and the curvature radius R2 of the stopper portion 44 will be explained with reference to FIGS. 13A and 13B.

In the following mathematical formulas 1 to 4, the following symbols respectively designate the following definitions:

R1=the curvature radius of the projecting portion 41;
R2=the curvature radius of the stopper portion 44;
D1=the outer diameter of the projecting portion 41=the outer diameter of the circumscribed circle of the projecting portion 41;
D2=the outer diameter of the stopper portion 44=the outer diameter of the inscribed circle of the stopper portion 44;
Δr=the radius difference between the projecting portion 41 and the stopper portion 44 (Δr=(D1−D2)/2);
ψ=the half of the shift angle (ψ=the shift angle θ/2);
k=coefficient for a circumferential end (0<k<1)

In the present embodiment, the following conditions are satisfied;
i) D1>D2;
ii) R1<R2; and
iii) the projecting portion 41 and the stopper portion 44 are smoothly connected with each other in the circumferential direction.

The projecting portion 41 is brought into contact with the motor housing 30 prior to the stopper portion 44. When the stator core is deformed, the stopper portion 44 is brought into contact with the motor housing 30.

It is necessary that the shape of the stator core comes closer to the exact circle after the shrink fitting process, so that tensile stress may not concentrate on the motor housing 30. Therefore, the following conditions (A) and (B) must be satisfied before the shrink fitting process;

(A) the curvature radius R1 of the projecting portion 41 is smaller than the radius (D1/2) of the circumscribed circle of the projecting portion 41; and
(B) the curvature radius R2 of the stopper portion 44 is larger than the radius (D2/2) of the inscribed circle of the stopper portion 44.

Figure 13A:
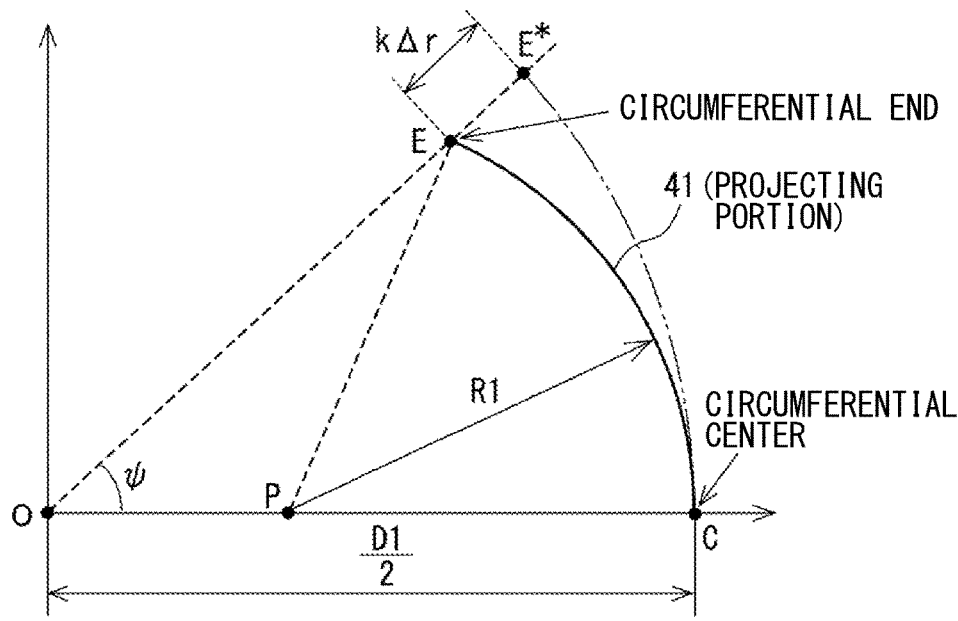
FIGS. 13A and 13B are schematic views for explaining mathematical formulas for curvature radius R1 and R2 of the projecting portion and the stopper portion.
Figure 13B:
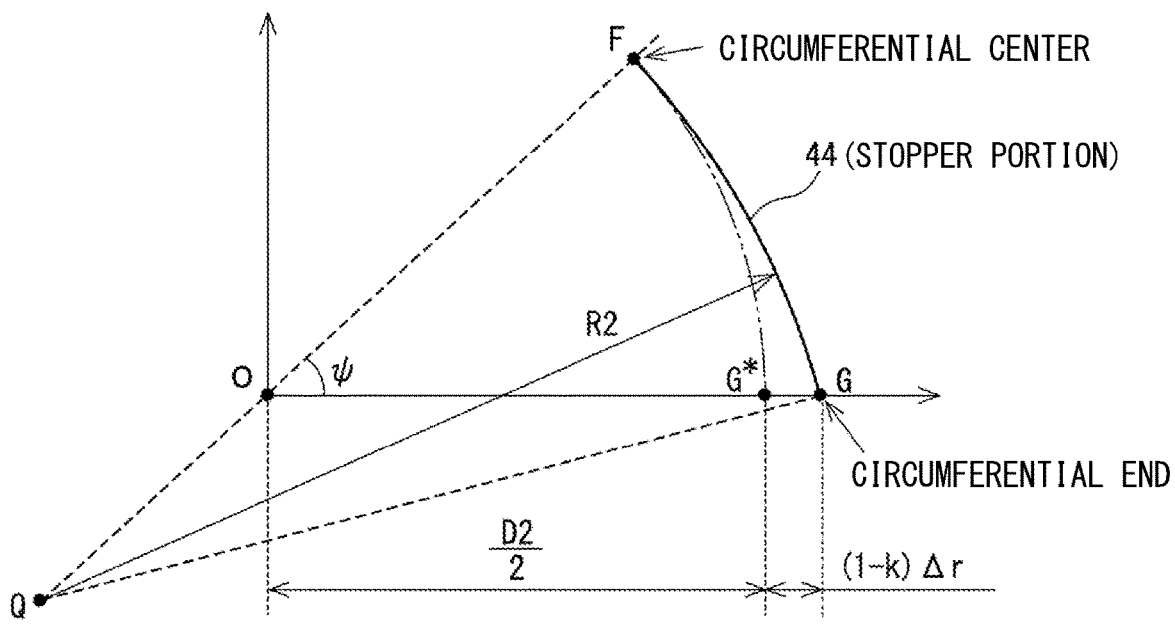

Each of FIGS. 13A and 13B is a view for explaining the above conditions (A) and (B). In the mathematical formulas (explained below), each of the symbols "R1", "R2", "D1" and "D2" is indicated by the respective subscript, namely by "$R_1$", "$R_2$", "$D_1$" and "$D_2$".

In FIG. 13A, the center of the stator 40 is indicated by "O", the circumferential center of the projecting portion 41 is indicated by "C", the circumferential end of the projecting portion 41 is indicated by "E", and the center of the curvature radius R1 is indicated by "P". An angle formed at the center "O" between circumferential center "C" and the circumferential end "E" is indicated by "ψ", which corresponds to the half of the shift angle "θ". A length of a line segment OC is equal to the radius (D1/2) of the circumscribed circle. Since the condition of "R1<(D1/2)" is satisfied, the center "P" is located on the line segment OC. An intersection point between the circumscribed circle passing through the circumferential center "C" and an extended line of a line segment OE is indicated by "E*".

In FIG. 13B, the center of the stator 40 is indicated by "O", the circumferential center of the stopper portion 44 is indicated by "F", the circumferential end of the stopper portion 44 is indicated by "G", and the center of the curvature radius R2 is indicated by "Q". An angle formed at the center "O" between the circumferential center "F" and the circumferential end "G" is indicated by "ψ", which corresponds to the half of the shift angle "θ". A length of a line segment OF is equal to the radius (D2/2) of the inscribed circle. Since the condition of "R2>(D2/2)" is satisfied, the center "Q" is located on an extended line of the line segment OF. An intersection point between the inscribed circle passing through the circumferential center "F" and a line segment OG is indicated by "G*".

In a case that the circumferential end "E" of the projecting portion 41 and the circumferential end "G" of the stopper portion 44 coincide with each other, the radius OE of the projecting portion 41 becomes equal to the radius OG of the stopper portion 44. A sum of a length of a line segment EE* and a length of a line segment GG* is equal to the radius difference "Δr". When the coefficient "k" for the circumferential end is used, each of the lengths for the line segment "EE*" and the line segment "GG*" is respectively indicated by "kΔr" and "(1−k) Δr".

As shown in FIG. 13A, a length of each side (line segments OE, OP and PE) of a triangle OPE is indicated by "(D1/2)−kΔr", "(D1/2)−R1" and "R1". The following formula (1) is satisfied based on the cosine theorem. When the formula (1) is coordinated by "R1", the following formula (2) is obtained.

<Formula 1>

$$R_1^2 = \left(\frac{D_1}{2} - k\Delta r\right)^2 + \left(\frac{D_1}{2} - R_1\right)^2 - 2\left(\frac{D_1}{2} - k\Delta r\right)\left(\frac{D_1}{2} - R_1\right)\cos\phi \quad (1)$$

<Formula 2>

$$R_1 = \frac{D_1\left(\frac{D_1}{2} - k\Delta r\right)(1 - \cos\phi) + (k\Delta r)^2}{D_1(1 - \cos\phi) + 2k\Delta r\cos\phi} \quad (2)$$

As shown in FIG. 13B, a length of each side (line segments OG, OQ and QG) of a triangle OQG is indicated by "(D2/2)+(1−k) Δr", "R2−(D2/2)" and "R2". The following formula (3) is satisfied based on the cosine theorem. When the formula (3) is coordinated by "R2", the following formula (4) is obtained.

<Formula 3>

$$R_2^2 = \left\{\frac{D_2}{2} + (1-k)\Delta r\right\}^2 + \left(\frac{D_2}{2} - R_2\right)^2 - 2\left\{\frac{D_2}{2} + (1-k)\Delta r\right\}\left(\frac{D_2}{2} - R_2\right)\cos\phi \quad (3)$$

<Formula 4>

$$R_2 = \frac{D_2\left\{\frac{D_2}{2} + (1-k)\Delta r\right\}(1 - \cos\phi) + \{(1-k)\Delta r\}^2}{D_2(1 - \cos\phi) - 2(1-k)\Delta r\cos\phi} \quad (4)$$

As above, each of the curvature radius R1 of the projecting portion 41 and the curvature radius R2 of the stopper portion 44 can be calculated by use of the above formulas (2) and (4) based on "the shift angle θ", "the diameter D1 of the circumscribed circle of the projecting portion 41", "the diameter D2 of the inscribed circle of the stopper portion 44" and "the coefficient "k" for the circumferential end (which is optionally decided)".

Further Embodiments and/or Modifications (M1) In FIG. 2 of the above embodiment, the projecting portions 41 and the stopper portion 44s are alternately arranged in the circumferential direction of the stator 40, wherein the unit element number is two (m=2), the cycle unit number is six (N=6), and the shift angle is 30 degrees (θ=30°). The present disclosure is not limited to the above figures. The shift angle "θ" of the stator 40 may be decided based on the unit element number "m", the cycle unit number "N", and a formula "θ=360×n/(m×N)[°]", wherein "n" is a natural number except for a number of "m".

Figure 14:
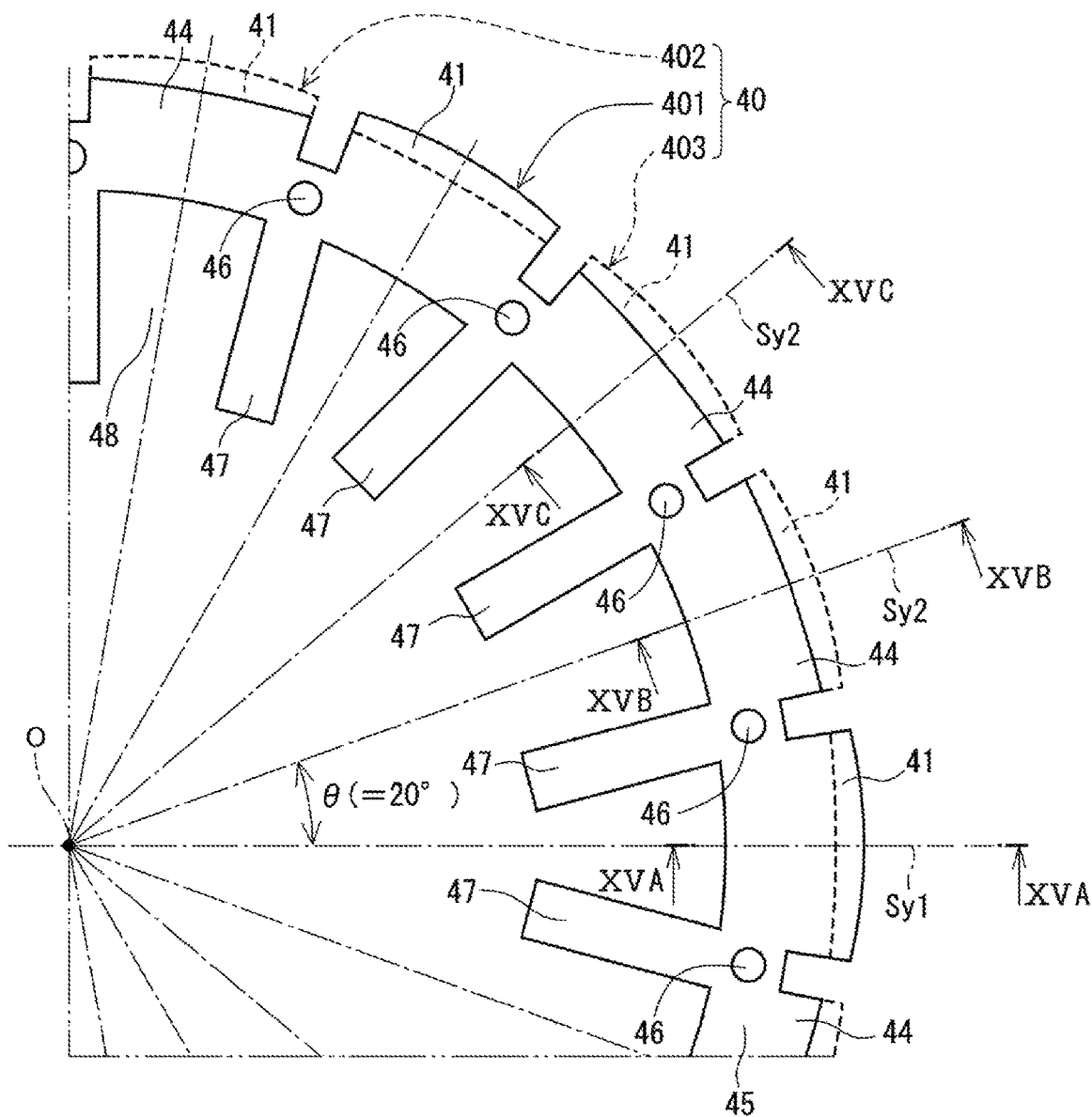
FIG. 14 is a schematic view showing a part of a stator according to a modification of the present disclosure.

As shown in a modification of FIG. 14, the cycle unit may be composed of one projecting portion 41 and two stopper portions 44, so that each of those portions are arranged in the circumferential direction in an order of "the projecting portion 41—the stopper portion 44—the stopper portion 44—the projecting portion 41—the stopper portion 44—the stopper portion—...". In FIG. 14, the first stator core sheet 401 is indicated by the solid line, while the second and the third stator core sheets 402 and 403 are indicated by the dotted lines. In FIG. 14, the magnetic pole teeth 47 for the second and the third stator core sheets 402 and 403 are omitted. In the modification of FIG. 14, the unit element number is three (m=3), the cycle unit number is six (N=6), and the shift angle is 20 degrees (θ=20°). In addition, in a case of "n=2", the shift angle becomes 40 degrees "θ=40°". In a case of "n=4", the shift angle becomes 80 degrees (θ=80°). Each of the connecting portions 46 is located at the position, which is displaced in the circumferential direction from the circumferential center of the projecting portion 41 by the half of the shift angle "θ". In the modification of FIG. 14, the connecting portions 46 are arranged at equal intervals of the shift angle of "θ=20°".

Figure 15A:
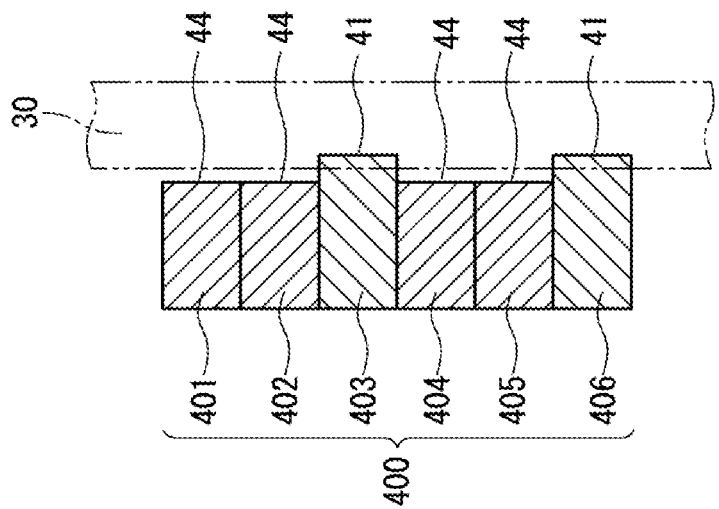
FIGS. 15A, 15B and 15C are schematic cross-sectional views taken along lines XVa-XVa, XVb-XVb and XVc-XVc in FIG. 14.
Figure 15B:
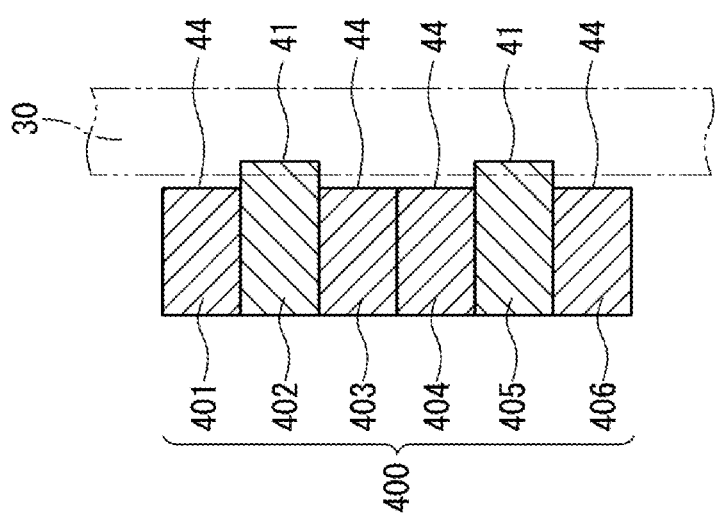
Figure 15C:
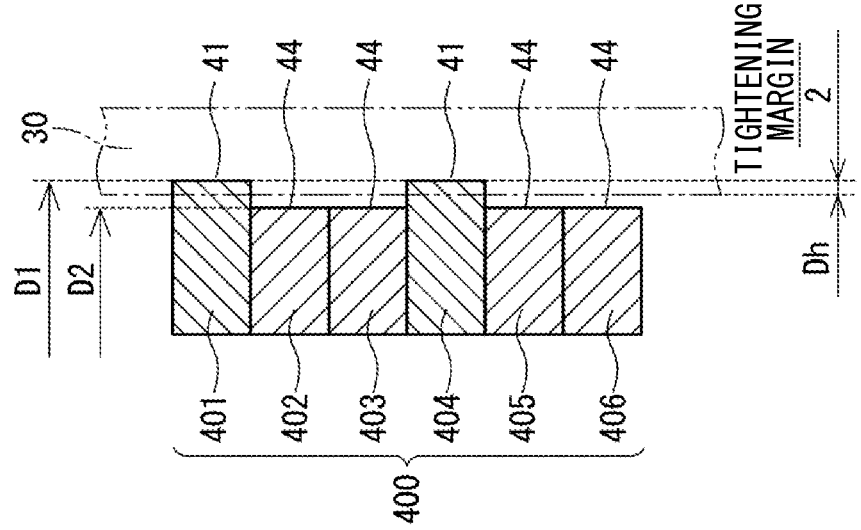

In the case of the unit element number is three (m=3) and the stator core is composed of six stator core sheets, the projecting portions 41 appear in the first and the fourth stator core sheets 401 and 404 and the stopper portions 44 appear in the second, the third, the fifth and the sixth stator core sheets 402, 403, 405 and 406, as shown in the cross section of FIG. 15A. As shown in the cross section of FIG. 15B, the projecting portions 41 appear in the second and the fifth stator core sheets 402 and 405 and the stopper portions 44 appear in the first, the third, the fourth and the sixth stator core sheets 401, 403, 404 and 406. As shown in the cross section of FIG. 15C, the projecting portions 41 appear in the third and the sixth stator core sheets 403 and 406 and the stopper portions 44 appear in the first, the second, the fourth and the fifth stator core sheets 401, 402, 404 and 405.

In the modification that the unit element number is three (m=3), the cycle unit may be alternatively composed of the two projecting portions 41 and one stopper portion 44.

In another modification that the unit element number is four (m=4), the cycle unit may be composed of "one projecting portion 41 and three stopper portions 44", "two projecting portions 41 and two stopper portions 44", or "three projecting portions 41 and one stopper portion 44". In each of the above combinations, the projecting portion 41 and the stopper portion 44 are arranged in the following order:

"the projecting portion 41—the stopper portion 44—the stopper portion 44—the stopper portion 44";

"the projecting portion 41—the projecting portion 41—the stopper portion 44—the stopper portion 44"; or "the projecting portion 41—the projecting portion 41—the projecting portion 41—the stopper portion 44".

In the above combinations, one or more than one projecting portion 41 and one or more than one stopper portion 44 are combined and arranged in a cyclic manner.

FIG. 16 is a table showing combinations of the unit element number "m", the cycle unit number "N" and the shift angle "θ", in the case of "n=1". In a case of "N=1", one projecting portion 41 is provided in the stator core and excessive load is applied to the motor housing in the circumferential direction. Therefore, the first example of "N=1" is not employed in an actual use. As a result, each of the unit element number "m" and the cycle unit number "N" is a natural figure equal to 2 (two) or more than 2 (two).

(M2) In the above embodiment, the stator 40 is composed of one stator core (the single-type stator core), wherein the multiple stator core sheets are built up in the axial direction and each of the stator core sheets has the annular shape. However, the stator 40 may be composed of multiple stator core units divided in the circumferential direction but connected to one another in the circumferential direction (the division-type stator core), wherein each of such divided stator core units includes multiple stator core sheets built up in the axial direction. A number of division for the divided stator core units and the cycle unit number may be optionally decided.

In the above embodiment, "the shift angle" can be also called as "a built-up-rotation angle. However, since a built-up-rotation process is not carried out in the case of the stator having the divided stator core units, the use of the term "the built-up-rotation" may not be proper. Therefore, in the present disclosure, the term "the shift angle" is used for the angle between the projecting portion 41 and the stopper portion 44 in the stator having the structure of the above embodiment or in the stator having the structure of the divided stator core units.

(M3) The curvature radius R1 of the projecting portion 41 is not limited to the value, which is smaller than the radius "D1/2" of the first virtual circle (equal to the circumscribed circle) having its center at the center "O" of the stator and passing through the circumferential center of the outer peripheral line of the projecting portion 41. The curvature radius R1 may have a value equal to the radius "D1/2" of the first virtual circle. The first virtual circle is also referred to as "the circumscribed circle of the projecting portion 41", which includes the above case of "R1=(D1/2)".

In a similar manner, the curvature radius R2 of the stopper portion 44 is not limited to the value, which is larger than the radius "D2/2" of the second virtual circle (equal to the inscribed circle) having its center at the center "O" of the stator and passing through the circumferential center of the outer peripheral line of the stopper portion 44. The curvature radius R2 may have a value equal to, or smaller than, the radius "D2/2" of the second virtual circle. The second virtual circle is also referred to as "the circumscribed circle or the inscribed circle of the stopper portion 44", which includes the above case of "R2=(D2/2)" or R2<(D2/2).

(M4) The structure of the rotor 60 is not limited to an inside-permanent magnet structure (the IPM structure). The rotor 60 may have a surface-permanent structure (the SPM structure), according to which the permanent magnets are fixed to an outer peripheral surface of the rotor core. In addition, the rotor 60 is not limited to a built-up structure. The rotor 60 may be made of such a member, which is integrally formed in the axial direction.

(M5) The material for the motor housing 30 is not limited to ADC12. For example, aluminum, aluminum alloy, magnesium or magnesium alloy may be used as the material for the motor housing 30. In a case that the material having a yielding point or 0.2-percent withstanding force, which is smaller than 200 MPa, is used, the effect of the present embodiment for uniformalizing the outer peripheral stress of the motor housing can be more advantageously used.

As above, the present disclosure is not limited to the above embodiment and/or the modifications, but can be further modified in various manners without departing from a spirit of the present disclosure.

What is claimed is:

1. A stator assembly comprising:
a motor housing of a cylindrical shape; and
a stator fixed to an inner peripheral wall of the motor housing by a shrink fitting process,
wherein the stator is composed of;
a single-type stator core, in which multiple stator core sheets of an annular shape are built up in an axial direction, or
a division-type stator core, in which multiple stator core units are connected to one another in a circumferential direction and multiple stator core sheets are built up in the axial direction in each of the stator core units,
wherein the stator core includes;
multiple projecting portions, wherein at least a circumferential part of an outer peripheral surface of each projecting portion is in contact with the inner peripheral wall of the motor housing; and
multiple stopper portions, each of which is smaller than each of the projecting portions in a radial direction, wherein at least a circumferential part of an outer peripheral surface of each stopper portion is in contact with the inner peripheral wall of the motor housing in a part of an actual-use temperature range,
wherein the projecting portions and the stopper portions are arranged in the circumferential direction in a cyclic manner,
wherein a cycle unit is composed of one or more than one projecting portion and one or more than one stopper portion,
wherein the stator core sheets are built up in such a way that the cycle units are alternately arranged in the axial direction and neighboring stator core sheets neighboring to each other in the axial direction are displaced in the circumferential direction by a predetermined shift angle, and
wherein a curvature radius of the projecting portion at a position, at which the projecting portion is in contact with the inner peripheral wall of the motor housing, is equal to or smaller than a radius of a circumscribed circle of the projecting portion.

2. The stator assembly according to claim 1, wherein
a radius difference between the radius of the circumscribed circle of the projecting portion and a radius of an inscribed circle or a circumscribed circle of the stopper portion is equal to or smaller than a tightening margin, which corresponds to a difference between a diameter of the circumscribed circle of the projecting portion and an inner diameter of the motor housing.

3. The stator assembly according to claim 1, wherein
a curvature radius of the stopper portion is equal to or larger than the radius of the inscribed circle of the stopper portion.

4. The stator assembly according to claim 1, wherein
in a circumferential boundary portion between the projecting portion and the stopper portion, which is displaced from a circumferential center of the projecting portion in the circumferential direction by a half of the shift angle,
a radial distance between a first extended point and a second extended point is equal to or smaller than a half of a radius difference,
wherein the first extended point corresponds to a point extended from an outer peripheral line of the projecting portion in the circumferential direction,
wherein the second extended point corresponds to a point extended from an outer peripheral line of the stopper portion in the circumferential direction, and
wherein the radius difference is a difference between the radius of the circumscribed circle of the projecting portion and a radius of an inscribed circle or a circumscribed circle of the stopper portion.

5. The stator assembly according to claim 1, wherein
a linear expansion coefficient for material of the motor housing is different from that of the stator core of the stator.

6. The stator assembly according to claim 5, wherein
a ratio of a contact surface pressure between the motor housing and the stopper portion with respect to a contact surface pressure between the motor housing and the projecting portion is decreased in accordance with a temperature increase, wherein the tightening margin between the motor housing and the stator is decreased in accordance with the temperature increase.

7. The stator assembly according to claim 6, wherein
the stopper portion is not in contact with the motor housing in a high temperature part of the actual-use temperature range, in which the tightening margin between the motor housing and the stator is relatively decreased in accordance with the temperature increase.

8. The stator assembly according to claim 1, wherein
the stator core has multiple magnetic pole teeth, which are arranged in the circumferential direction and each of which extends from a back yoke portion of the stator core in a radial-inward direction,
each of the magnetic pole teeth is formed at an initial circumferential position before the stator is fixed to the motor housing by the shrink fitting process,
wherein the initial circumferential position is displaced from a target circumferential position in an opposite circumferential direction to a circumferential deforming direction,
wherein the circumferential deforming direction corresponds to a direction in which each of the magnetic pole teeth is deformed in the shrink fitting process, and
wherein the target circumferential position corresponds to a position of each of the magnetic pole teeth after the shrink fitting process.

9. The stator assembly according to claim 1, wherein
the stator core has multiple magnetic pole teeth, which are arranged in the circumferential direction and each of which extends from a back yoke portion of the stator core in a radial-inward direction,
each of the magnetic pole teeth is formed at an initial radial position before the stator is fixed to the motor housing by the shrink fitting process,
wherein the initial radial position is displaced from a target radial position in an opposite radial direction to a radial deforming direction,
wherein the radial deforming direction corresponds to a direction in which each of the magnetic pole teeth is deformed in the shrink fitting process, and
wherein the target radial position corresponds to a position of each of the magnetic pole teeth after the shrink fitting process.

10. The stator assembly according to claim 1, wherein
the stator core has multiple connecting portions, which are formed in a back yoke portion for connecting the multiple stator core sheets in the axial direction,
wherein the connecting portions are arranged in the circumferential direction at equal intervals of the predetermined shift angle from a reference position, which is displaced in the circumferential direction from a circumferential center of the projecting portion by a half of the shift angle.

11. The stator assembly according to claim 1, wherein the motor housing is made of such material, which includes aluminum, aluminum alloy, magnesium and magnesium alloy.

12. The stator assembly according to claim 1, wherein the shift angle is calculated by the following formula;

$$\theta = 360 \times n / (m \times N) [°]$$

wherein

"$\theta$" is the shift angle,

"m" is a unit element number, which is a sum of the projecting portions and the stopper portions in one cycle unit, "N" is a cycle unit number of the cycle units formed in a range of 360 degrees, and "n" is a natural figure other than that of "m".

13. An electric motor comprising;

the stator assembly according to claim 1;

a stator coil wound on the magnetic pole teeth of the stator core; and a rotor movably accommodated in an inside of the stator with a radial gap between the rotor and the stator.

* * * * *